(12) United States Patent
Tomeba et al.

(10) Patent No.: US 9,130,629 B2
(45) Date of Patent: Sep. 8, 2015

(54) WIRELESS COMMUNICATION SYSTEM, BASE STATION DEVICE, AND TERMINAL DEVICE

(75) Inventors: Hiromichi Tomeba, Osaka (JP); Takashi Onodera, Osaka (JP); Hiroshi Nakano, Osaka (JP); Alvaro Ruiz Delgado, Osaka (JP); Shimpei To, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 9 days.

(21) Appl. No.: 14/002,616

(22) PCT Filed: Mar. 2, 2012

(86) PCT No.: PCT/JP2012/055406

§ 371 (c)(1),
(2), (4) Date: Sep. 3, 2013

(87) PCT Pub. No.: WO2012/121153

PCT Pub. Date: Sep. 13, 2012

(65) Prior Publication Data

US 2013/0336418 A1      Dec. 19, 2013

(30) Foreign Application Priority Data

Mar. 4, 2011   (JP) ................................. 2011-047690

(51) Int. Cl.
*H04B 7/04* (2006.01)
*H04L 1/00* (2006.01)
*H04B 7/06* (2006.01)

(52) U.S. Cl.
CPC ............ *H04B 7/0482* (2013.01); *H04L 1/0003* (2013.01); *H04B 7/0452* (2013.01); *H04B 7/0465* (2013.01); *H04B 7/0632* (2013.01); *H04B 7/0697* (2013.01)

(58) Field of Classification Search
CPC .. H04B 7/0626; H04B 7/0417; H04B 7/0413; H04B 7/0452; H04B 7/06; H04B 7/0619; H04B 7/0673; H04B 7/0697; H04L 2025/03426; H04L 1/0003

USPC .......................... 375/260, 267, 296, 299, 346
See application file for complete search history.

(56) References Cited

U.S. PATENT DOCUMENTS

2006/0198459 A1* 9/2006 Fischer et al. ................. 375/267
2009/0016463 A1* 1/2009 Roh .............................. 375/295
2010/0046658 A1  2/2010 Yosoku et al.

FOREIGN PATENT DOCUMENTS

WO    2006/098379 A1    9/2006
WO    2008/088066 A1    7/2008

OTHER PUBLICATIONS

Official Communication issued in International Patent Application No. PCT/JP2012/055406, mailed on Jun. 5, 2012.

(Continued)

*Primary Examiner* — Shuwang Liu
*Assistant Examiner* — David S Huang
(74) *Attorney, Agent, or Firm* — Keating & Bennett, LLP

(57) ABSTRACT

A terminal device notifies a base station device about control information associated with a receive quality of the terminal device. The base station device performs data modulation on a plurality of pieces of transmit data for the terminal device, by using a plurality of different data modulation schemes one by one, based on the control information, and spatially multiplexes the plurality of pieces of transmit data after the data modulation over a single wireless resource and transmits a spatially multiplexed signal. The terminal device receives the signal with the plurality of pieces of transmit data spatially multiplexed, and detects desirable transmit data from the receive signal, based on a first channel matrix which represents channel state information between the base station device and the terminal device and a second channel matrix in which the first channel matrix is multiplied by a transform matrix. Accordingly, an adaptive modulation technology is applied even to MIMO spatial multiplexing transmission using a LR technology, and hence a wireless communication system and so forth that can contribute to improvement in frequency utilization efficiency can be provided.

4 Claims, 22 Drawing Sheets

(56) References Cited

OTHER PUBLICATIONS

Wuebben et al., "Near-maximum-likelihood detection of MIMO systems using MMSE-based lattice-reduction", Proc. IEEE ICC2004, vol. 2, Jul. 1, 2004, pp. 798-802.

Lenstra et al., "Factoring polynomials with rational coefficients", Mathematische Annalen, vol. 261, Dec. 1, 1982, pp. 515-534.

Windpassinger et al., "From lattice-reduction-aided detection towards maximum-likelihood detection in MIMO systems", Proc. Int. Conf. Wireless and Optical Communications, Banff, Canada, Jul. 1, 2003, 5 pages.

\* cited by examiner

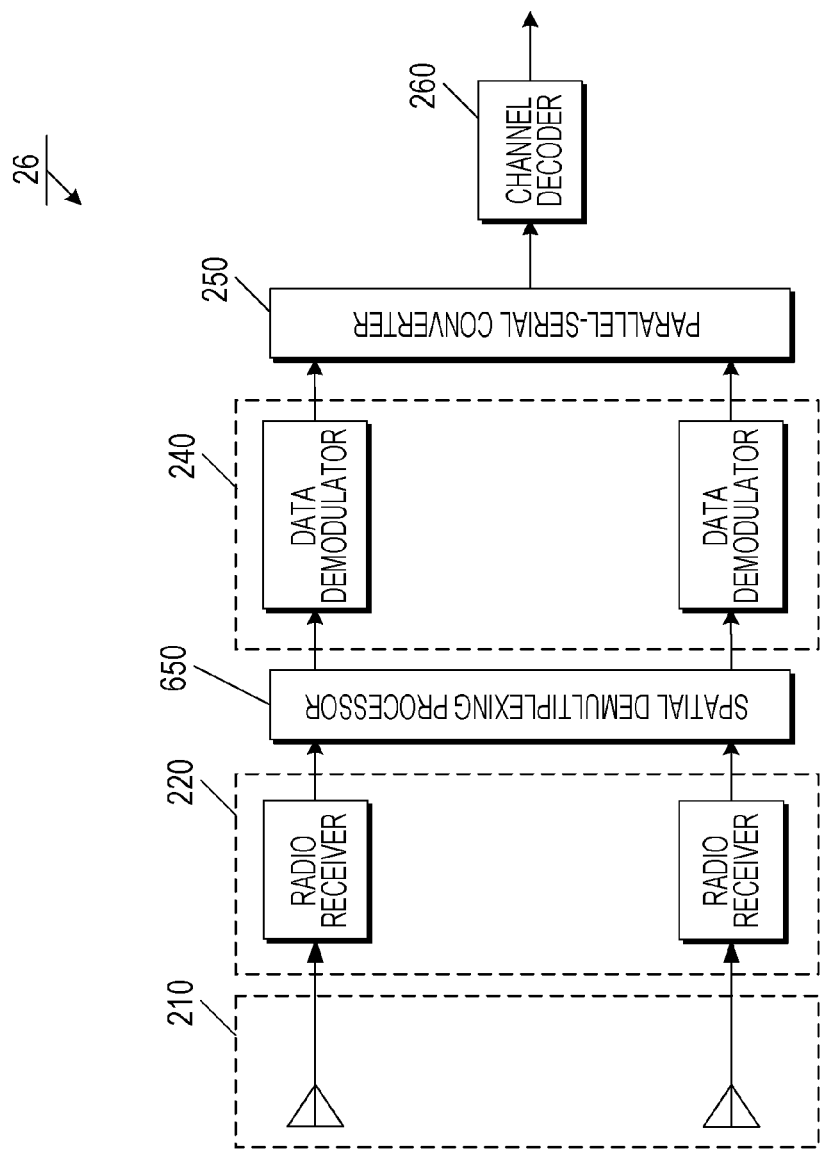

WIRELESS COMMUNICATION SYSTEM, BASE STATION DEVICE, AND TERMINAL DEVICE

TECHNICAL FIELD

The present invention relates to a wireless communication system and so forth.

BACKGROUND ART

In long term evolution (LTE), which has been standardized in the $3^{rd}$ generation partnership project (3GPP) and has served as the 3.9-generation radio transmission scheme, a multiple input multiple output (MIMO) technology that performs radio transmission by using a plurality of transmit and receive antennas has been specified for markedly increasing a frequency utilization efficiency as compared with 3rd generation radio transmission schemes.

A spatial multiplexing (SM) technology, which is one of MIMO technologies, can realize an increase in transmission speed without expansion in frequency bandwidth. Also, LTE-advanced (LTE-A), which is an extension of LTE, has been approved as one of 4th generation radio transmission schemes by International Telecommunication Union Radiocommunications Sector (ITU-R), and standardization of LTE-A is actively promoted. In LTE-A, single user MIMO (SU-MIMO), which can provide spatial multiplexing by 8 streams at maximum, is being studied to achieve a peak transmission speed of 1 Gbps in downlink transmission (from base station device to mobile station device). SU-MIMO is MIMO transmission between a base station device having a plurality of transmit antennas, and a single mobile station device having a plurality of receive antennas.

However, the number of receive antennas that can be arranged in the mobile station device is limited. To improve the frequency utilization efficiency, it is required to employ multi-user MIMO (MU-MIMO), in which a plurality of concurrently connected mobile station devices are assumed as a large-scale antenna array and transmit signals from a base station devices to the mobile station devices are spatially multiplexed. MU-MIMO has been already specified in LTE Release 8 (Rel. 8). MU-MIMO employed by the Rel. 8 is a scheme called beam forming in which multiplication of a linear filter is performed in a base station device. Linear MU-MIMO using the linear filter is also expected to be employed in systems of Rel. 9 and later.

In the MIMO transmission, different pieces of transmit data (data streams) are transmitted from the plurality of transmit antennas with the same frequency, and hence a spatial demultiplexing technology is required to detect a desirable signal in the receiver. A technology, which is well known as the spatial demultiplexing technology, is spatial filtering. This is a technology that calculates a linear filter based on the criterion of zero-forcing (ZF) or minimum mean square error (MMSE) from a channel matrix which represents channel state information (CSI) between the transmitter and the receiver, and performs multiplication of the linear filter in the receiver.

However, the spatial filtering has a spatial demultiplexing performance which is markedly degraded as compared with maximum likelihood detection (MLD), which is an optimal spatial demultiplexing technology, although the spatial filtering only requires a small computation amount. In particular, as a spatial correlation increases in a channel, the degradation in performance increases.

In recent years, to increase the spatial demultiplexing performance of the spatial filtering, application of a lattice reduction (LR) technology to the MIMO transmission is receiving attention, and the application is discussed in NPL 1, NPL 3, etc. With the LR technology, a channel matrix is multiplied by a unimodular matrix and is transformed into a channel matrix with high orthogonality. Accordingly, the spatial demultiplexing performance of the spatial filtering can be increased.

CITATION LIST

Non Patent Literature

NPL 1: D. Wubben, et. al., "Near-maximum-likelihood detection of MIMO systems using MMSE-based lattice-reduction," Proc. IEEE ICC2004, Vol. 2, pp. 798-802, July 2004.

NPL 2: A. K. Lenstra, et. al., "Factoring polynomials with rational coefficients," Math. Ann, Vol. 261, pp. 515-534, 1982.

NPL 3: C. Windpassinger, et. al., "From lattice-reduction-aided detection towards maximum-likelihood detection in MIMO systems," Proc. Int. Conf. Wireless and Optical Communications, Banff, Canada, July 2003.

SUMMARY OF INVENTION

Technical Problem

A well-known algorithm that can efficiently calculate the unimodular matrix is a LLL algorithm described in NPL 2. NPL 1 discloses that the spatial filtering provides a transmission performance substantially similar to MLD by using the LR technology. However, to properly apply the LR technology, data modulation schemes used for spatially multiplexed data streams have to be matched.

Also, in a wireless communication technology in which a channel has time and frequency selectivity, an adaptive modulation technology that adaptively changes a modulation scheme and a coding rate in accordance with the channel state is required for the increase in frequency utilization efficiency. Use of the adaptive modulation technology to the MIMO transmission represents assignment of different modulation schemes to respective spatially multiplexed data streams. Hence, if the LR technology is used for the MIMO transmission, the adaptive modulation technology that applies the different modulation schemes to the respective data streams cannot be introduced. This has limited the improvement in frequency utilization efficiency.

In light of the problems, an object of the invention is to provide a wireless communication system and so forth that can contribute to improvement in frequency utilization efficiency by applying an adaptive modulation technology, even in MIMO spatial multiplexing transmission using a LR technology.

Solution to Problem

To solve the above-described problems, a wireless communication system and so forth of the invention includes the following features.

A wireless communication system according to the invention includes a base station device having a plurality of antennas, and a terminal device having a plurality of antennas, in which
  the terminal device
  notifies the base station device about control information associated with a receive quality of the terminal device, the base station device
is able to use a plurality of different data modulation schemes,
performs data modulation on a plurality of pieces of transmit data for the terminal device, by using the plurality of different data modulation schemes one by one, based on the control information, and
spatially multiplexes the plurality of pieces of transmit data after the data modulation over a single wireless resource and transmits a spatially multiplexed signal, and
the terminal device
receives the signal with the plurality of pieces of transmit data spatially multiplexed and transmitted from the base station device, and
detects desirable transmit data from the receive signal, based on a first channel matrix which represents channel state information between the base station device and the terminal device and a second channel matrix in which the first channel matrix is multiplied by a transform matrix.

Also, in the wireless communication system according to the invention, the transform matrix may be a matrix in which a determinant is 1 or −1 and all components may be Gaussian integers.

Also, in the wireless communication system according to the invention, the matrix in which the determinant is 1 or −1 and all the components are the Gaussian integers may be a matrix that transforms the first channel matrix into a matrix with high orthogonality.

Also, in the wireless communication system according to the invention,
the plurality of different data modulation schemes may be able to realize respective different frequency utilization efficiencies, and the plurality of different data modulation schemes may be associated with the respective different frequency utilization efficiencies, and
one of the plurality of different data modulation schemes, the one which is able to realize a maximum frequency utilization efficiency, may serve as a first data modulation scheme.

Also, in the wireless communication system according to the invention, a signal candidate point of each of the data modulation schemes may be extracted from a signal candidate point of the first data modulation scheme.

A wireless communication system according to the invention includes a base station device having a plurality of antennas, and a plurality of terminal devices each having at least one antenna, in which
the terminal devices
notify the base station device about first control information associated with receive qualities of the terminal devices and second control information associated with channel state information between the base station device and the terminal devices,
the base station device
is able to use a plurality of different data modulation schemes,
performs data modulation on a plurality of pieces of transmit data for the plurality of terminal devices, by using the plurality of different data modulation schemes one by one, based on the first control information,
acquires a first channel matrix which represents the channel state information between the base station device and the terminal device based on the second control information,
performs precoding on the plurality of pieces of transmit data after the data modulation, based on the first channel matrix and a second channel matrix in which the first channel matrix is multiplied by a transform matrix, and
spatially multiplexes the plurality of pieces of transmit data after the precoding over a single wireless resource and transmits a spatially multiplexed signal, and
the terminal devices
detect desirable data from the spatially multiplexed and transmitted signal.

Also, in the wireless communication system according to the invention, the transform matrix may be a matrix in which a determinant is 1 or −1 and all components may be Gaussian integers.

Also, in the wireless communication system according to the invention, the matrix in which the determinant is 1 or −1 and all the components are the Gaussian integers may be a matrix that transforms the first channel matrix into a matrix with high orthogonality.

Also, in the wireless communication system according to the invention,
the plurality of different data modulation schemes may be able to realize respective different frequency utilization efficiencies, and the plurality of different data modulation schemes may be associated with the respective different frequency utilization efficiencies, and
one of the plurality of different data modulation schemes, the one which is able to realize a maximum frequency utilization efficiency, may serve as a first data modulation scheme.

Also, in the wireless communication system according to the invention, a signal candidate point of each of the data modulation schemes may be extracted from a signal candidate point of the first data modulation scheme.

Also, in the wireless communication system according to the invention, an interval between signal candidate points of each of the data modulation schemes may be associated to be an integral multiple of an interval between signal candidate points of the first data modulation scheme.

Also, in the wireless communication system according to the invention, a signal candidate point of each of the data modulation schemes may be extracted from a signal candidate point of a second data modulation scheme which is calculated from the first data modulation scheme and the transform matrix.

Also, in the wireless communication system according to the invention, the precoding may be nonlinear arithmetic processing including a modulo arithmetic.

A base station device according to the invention is connected to a wireless communication system including the base station device having a plurality of antennas, and a terminal device having a plurality of antennas, in which
the base station device
is able to use a plurality of different data modulation schemes,
receives control information associated with a receive quality from the terminal device,
performs data modulation on a plurality of pieces of transmit data for the terminal device, by using the plurality of different data modulation schemes one by one, based on the control information, and
spatially multiplexes the plurality of pieces of transmit data after the data modulation over a single wireless resource and transmits a spatially multiplexed signal, so that the terminal device is able to detect desirable transmit data from the receive signal, based on a first channel matrix which represents channel state information between the base station device and the terminal device and a second channel matrix in which the first channel matrix is multiplied by a transform matrix.

A base station device according to the invention is connected with a wireless communication system including the base station device having a plurality of antennas, and a plurality of terminal devices each having at least one antenna, in which
the base station device
is able to use a plurality of different data modulation schemes,
receives first control information associated with receive qualities of the terminal devices and second control information associated with channel state information between the base station device and the terminal devices,
performs data modulation on a plurality of pieces of transmit data for the plurality of terminal devices, by using the plurality of different data modulation schemes one by one, based on the first control information,
acquires a first channel matrix which represents the channel state information between the base station device and the receivers based on the second control information,
performs precoding on the plurality of pieces of transmit data after the data modulation, based on the first channel matrix and a second channel matrix in which the first channel matrix is multiplied by a transform matrix, and
spatially multiplexes the plurality of pieces of transmit data after the precoding over a single wireless resource and transmits a spatially multiplexed signal, so that the terminal devices are able to detect desirable data from the spatially multiplexed and transmitted signal.

A terminal device according to the invention is connected to a wireless communication system including a base station device having a plurality of antennas, and the terminal device having a plurality of antennas, in which
the base station device
is able to use a plurality of different data modulation schemes, and
the terminal device
receives a signal in which a plurality of pieces of transmit data after data modulation are spatially multiplexed, the data modulation being performed on the plurality of pieces of transmit data by using the plurality of different data modulation schemes one by one, based on control information associated with a receive quality of the terminal device and notified to the base station device, and
detects desirable transmit data from the receive signal, based on a first channel matrix which represents channel state information between the base station device and the terminal device and a second channel matrix in which the first channel matrix is multiplied by a transform matrix.

A terminal device that is connected with a wireless communication system according to the invention includes a base station device having a plurality of antennas, and a plurality of the terminal devices each having at least one antenna, in which
the terminal devices
notify the base station device about first control information associated with receive qualities of the terminal devices and second control information associated with channel state information between the base station device and the terminal devices,
the base station device
is able to use a plurality of different data modulation schemes,
performs data modulation on a plurality of pieces of transmit data for the plurality of terminal devices, by using the plurality of different data modulation schemes one by one, based on the first control information,
acquires a first channel matrix which represents the channel state information between the base station device and the receivers based on the second control information,
performs precoding on the plurality of pieces of transmit data after the data modulation, based on the first channel matrix and a second channel matrix in which the first channel matrix is multiplied by a transform matrix, and
spatially multiplexes the plurality of pieces of transmit data after the precoding over a single wireless resource and transmits a spatially multiplexed signal, and
the terminal devices
detect desirable data from the spatially multiplexed and transmitted signal.

Advantageous Effects of Invention

With the invention, even in case of the MIMO transmission using the LR technology in the spatial demultiplexing processing, the different modulation schemes can be used for the respective data streams. Accordingly, the invention can contribute to the improvement in frequency utilization efficiency of the wireless communication system.

BRIEF DESCRIPTION OF DRAWINGS

FIG. 22 is an illustration showing a configuration of a distributed antenna according to the sixth embodiment.

FIG. 22 is an illustration showing a configuration of a terminal device according to the sixth embodiment.

DESCRIPTION OF EMBODIMENTS

An embodiment in which a wireless communication system of the invention is applied is described below with reference to the drawings. A matter described in this embodiment is merely an aspect for understanding the invention, and the content of the invention should not be interpreted in a manner limited to the embodiment.

1. Basic Technique

First, a basic technology of MIMO spatial multiplexing transmission using a LR technology is described. The description is aimed at communication in which a terminal device (also called receiver) including $N_r$ receive antennas is connected with a base station device (also called transmitter) including $N_t$ transmit antennas.

1.1 Base Station

Figure 1:
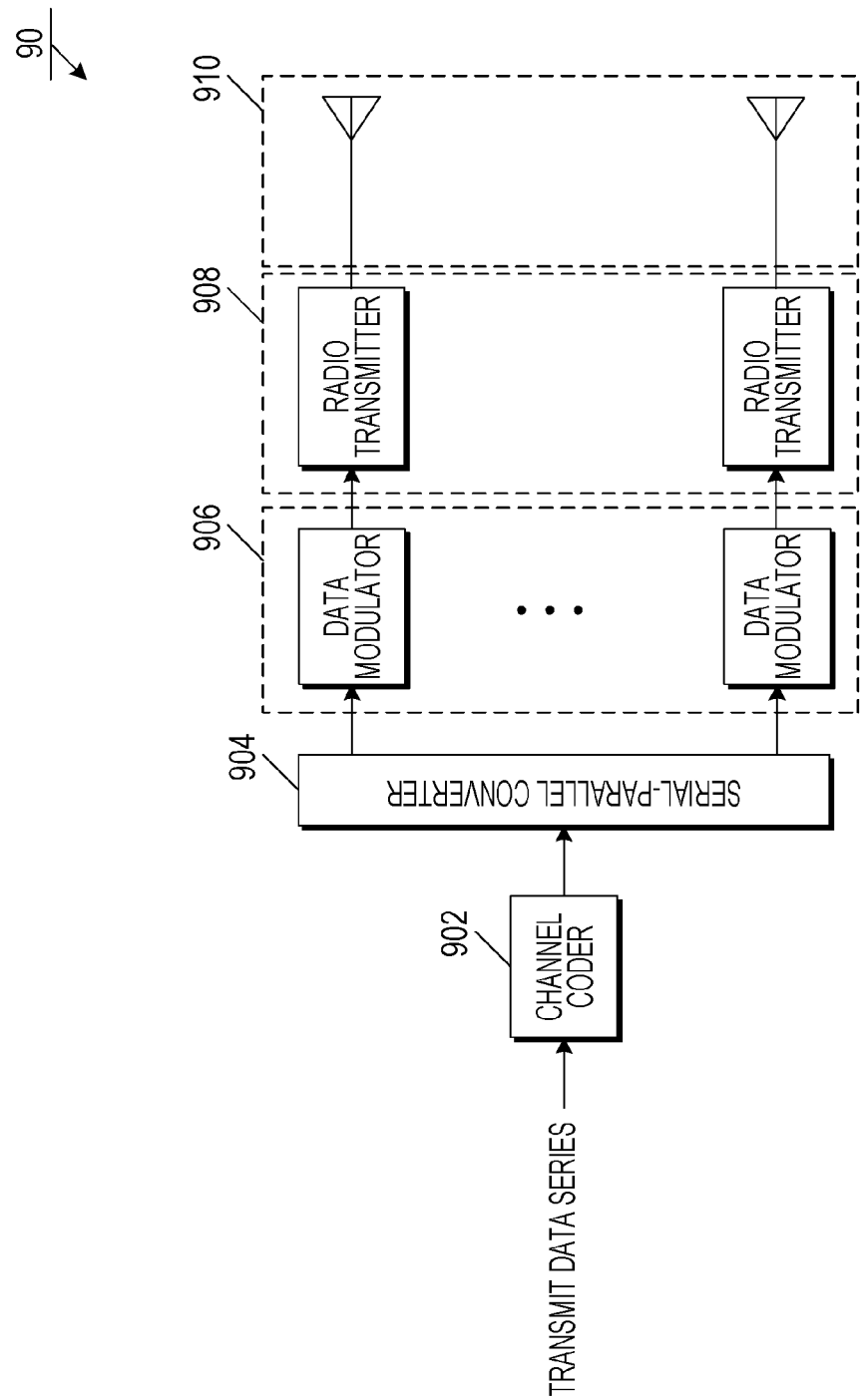
FIG. 1 is an illustration showing a configuration of a base station device for explaining a basic technology.

FIG. 1 is a block diagram showing a configuration of a base station device 90. Signal processing in the base station device 90 is described with reference to FIG. 1. It is assumed that the base station device 90, which is a transmitter, transmits R data streams to a terminal device 95, which is a receiver. R is also called rank, and normally has to satisfy min ($N_t$, $N_r$)≥R. Here, min (A, B) is a function that sends back a smaller value of A and B. Description is given below based on R=$N_t$=$N_r$.

Transmit data to the terminal device 95 is input to a channel coder 902, in which channel coding is performed. Then, the channel-coder output is input to a serial-parallel converter 904, in which the output is converted into parallel data with the rank R. In this method, the same coding rate is applied to the respective data streams. Alternatively, the transmit data may be input first to the serial-parallel converter 904, in which the transmit data is converted into the parallel data, and then the parallel data may be individually input to channel coders, in which channel coding is performed so that different coding rates are provided for the respective data streams.

Still alternatively, the transmit data may be converted into $R_c$ (<R) data streams (also called codewords), the codewords may be individually input to the channel coder 902, and the channel-coder output may be input to the serial-parallel converter 904, so that the R data streams are finally generated. Also, in an adaptive modulation technology (described later), the channel coding rate is typically changed in accordance with the channel state. However, description is given below based on that the coding rate is normally constant regardless of the channel state.

The serial-parallel converter 904 outputs are input to respective data modulators 906, in which data modulation of QPSK, 16QAM, etc., is performed. A data modulation scheme to be applied is determined in accordance with the channel state, that is, the adaptive modulation technology, which is determined in accordance with receive a quality of each data stream. As the number of bits that can be transmitted per one symbol (also called modulation level, modulation multilevel number) increases, a required transmission quality for the data modulation increases.

For example, 16QAM that can transmit four bits per one symbol has a higher required transmission quality than QPSK that can transmit two bits per one symbol. The adaptive modulation technology is aimed at realization of the maximum frequency utilization efficiency that can be achieved in a given wireless resource, by applying a modulation scheme with a small modulation multilevel number to a data stream with a low receive quality, and by applying a modulation scheme with a large modulation multilevel number to a data stream with a good receive quality.

In the adaptive modulation technology, the transmitter has to previously recognize the receive quality of the terminal device for each data stream. Although the transmitter can recognize the receive quality if the terminal device notifies the transmitter about the receive quality as control information, description is given below based on that the transmitter has ideally recognized the receive quality for each data stream.

The data modulators 906 perform data modulation on data input in accordance with the receive quality of the terminal device 95. If conventional QPSK or 16QAM is used as the modulation scheme, the LR technology cannot be applied at application of the spatial demultiplexing technology in the terminal device 95 (described later). The data modulation scheme that is performed in the data modulators 906 of this embodiment is described later.

The data-modulator outputs are input to radio transmitters 908 for antennas from which the respective data streams are transmitted. In the radio transmitters 908, transmit signals in a baseband are converted into transmit signals in a radio-frequency (RF) band. The output signals of the radio transmitters 908 are transmitted from respective transmit antennas 910.

1.2 Terminal Device

Figure 2:
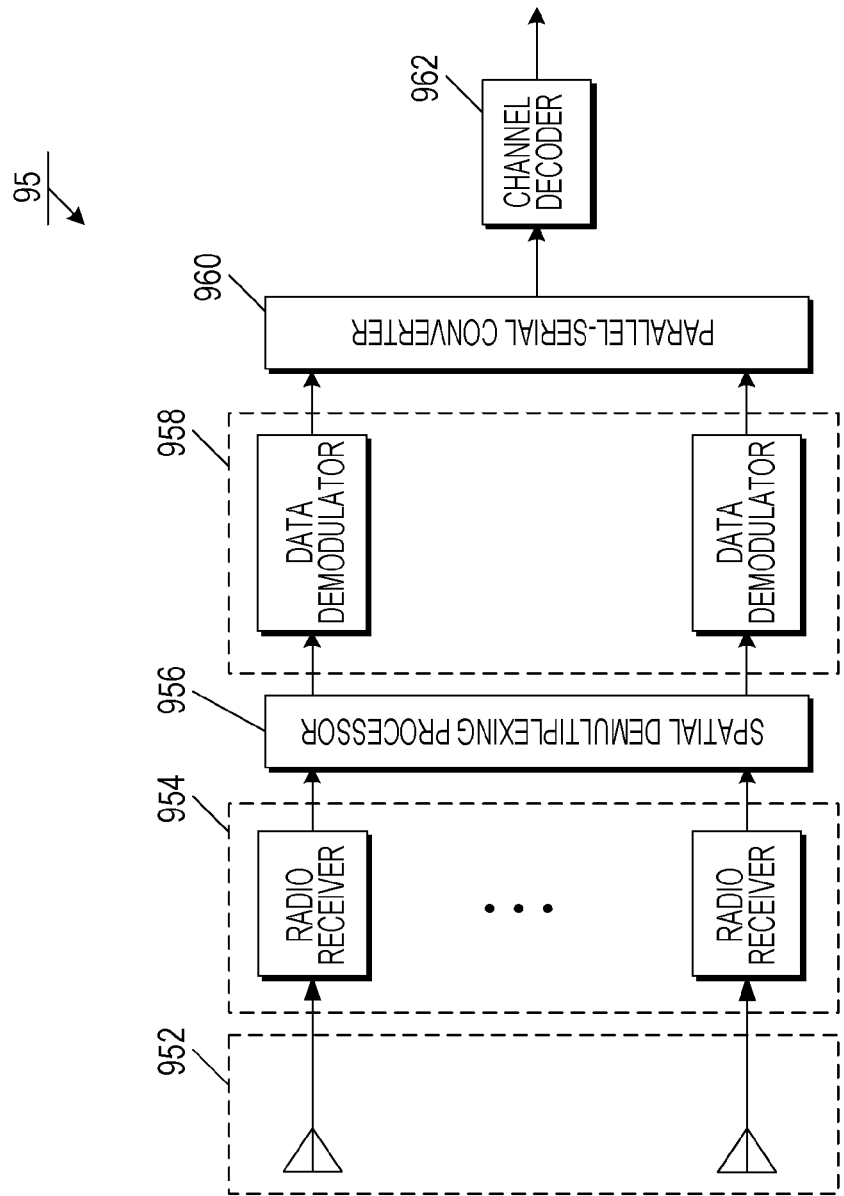
FIG. 2 is an illustration showing a configuration of a terminal device for explaining the basic technology.

FIG. 2 is a block diagram showing a configuration of the terminal device 95. Signal processing in the terminal device 95 is described with reference to FIG. 2.

In the terminal device 95, signals received by respective antennas 952 are input to corresponding radio receivers 954, in which the signals are converted into signals in a baseband. The signals converted into the baseband are input to a spatial demultiplexing processor 956 that applies signal demultiplexing processing for demultiplexing desirable data streams from the data streams, which have spatially multiplexed and received.

The signal demultiplexing processing is described. Description is given below based on that the signal demultiplexing processing is performed by spatial filtering that uses a lattice reduction (LR) technology.

It is assumed that $r_m$ is a receive signal received by an m-th receive antenna, and $r=[r_1, \ldots, r_{N_r}]^T$ is defined as a receive signal vector. It is to be noted that $[A]^T$ represents transposition processing on a matrix A. r is given by the following expression.

[Math. 1]

$$r = Hs + \eta \qquad (1\text{-}1)$$

$$H = \begin{pmatrix} h_{1,1} & \cdots & h_{1,N_t} \\ \vdots & \ddots & \vdots \\ h_{N_r,1} & \cdots & h_{N_r,N_t} \end{pmatrix}$$

$$s = [s_1, \ldots, s_{N_t}]^T$$

$$\eta = [\eta_1, \ldots, \eta_{N_r}]^T$$

Here, $h_{m,n}$ denotes a complex channel gain between an n-th antenna of the transmitter (the base station device) and an m-th antenna of the receiver (the terminal device). A channel matrix H formed of $h_{m,n}$ is a matrix including $N_r$ rows and $N_t$ columns. It is assumed that H is also called first channel matrix. $S_n$ denotes a transmit symbol that is transmitted from the n-th antenna of the transmitter. $\eta_m$ denotes a noise that is added at the m-th antenna.

In the spatial filtering, the spatial demultiplexing is performed by multiplying a received signal by a linear filter W with $N_t$ rows and $N_r$ columns. A receive signal $\hat{r}$ after the spatial filtering is given by the following expression.

[Math. 2]

$$\hat{r} = Wr \quad (2\text{-}1)$$

It is suggested that a linear filter based on the ZF criterion and the MMSE criterion is used for W. For example, a linear filter based on the ZF criterion may use an inverse matrix $H^{-1}$ of the channel matrix H. If $W=H^{-1}$ is substituted into Expression (2-1), the following expression is obtained.

[Math. 3]

$$\hat{r} = H^{-1}r \quad (2\text{-}2)$$
$$= s + H^{-1}\eta$$

Referring to Expression (2-2), it is found that the respective data streams are completely demultiplexed without interfering with each other. $\hat{r}$ given by Expression (2-2) is assumed as a soft decision value for s, and hence the terminal device 95 can detect a desirable signal in each data stream. As described above, the spatial demultiplexing processor 956 has to previously recognize the channel matrix H.

The linear filter based on the MMSE criterion is a filter that minimizes the mean square error between $\hat{r}$ and s. The linear filter can be expressed as a ZF linear filter, for example, in case that an extended channel matrix expressed by H'=[H σI] (σ denotes a standard deviation of a noise power applied to a receive signal, and I denotes a unit matrix) is assumed as the channel matrix.

Typically, the terminal device 95 may estimate the channel matrix H by using a known reference signal transmitted from the base station device 90. The known reference signal is multiplexed on the transmit data series and is transmitted. The multiplexing method may be time, frequency, or code division multiplexing. Description is given below based on that the known reference signal sequence and the transmit data series are ideally multiplexed not to interfere with each other, and the terminal device 95 can ideally estimate the channel matrix H by using the known reference signal.

Meanwhile, the spatial demultiplexing performance by the spatial filtering may be markedly degraded in accordance with the state of the channel matrix. For example, if a determinant for the channel matrix H is very small, noise enhancement may occur, and a receive-signal-to-noise power ratio (SNR) after the data stream is detected may be markedly decreased. If a linear filter based on the MMSE criterion that allows the residual inter-stream-interference after the filtering is used, the influence of the noise enhancement can be reduced. However, as compared with MLD, the spatial demultiplexing performance is still lower than MLD.

However, if the channel matrix is an orthogonal matrix, the noise enhancement due to the linear filter does not occur. The receive quality equal to MLD can be achieved even by the spatial filtering. A technology suggested in this point of view is a spatial filtering using a lattice reduction (LR) technology.

The LR technology is a technology that increases orthogonality of a matrix by performing matrix transform that multiples a given matrix by a unimodular matrix. There is suggested a LLL algorithm as an algorithm for efficiently obtaining the unimodular matrix. By applying the LR technology to the given channel matrix, the orthogonality of the channel can be increased. Hence, the influence of the noise enhancement, which may occur by the spatial filtering, can be decreased. In this embodiment, description is given below based on that an optimal unimodular matrix is calculated for the given channel matrix.

It is assumed that the channel matrix transformed by the LR technology is $\hat{H}$. $\hat{H}$ is also called second channel matrix. $\hat{H}$ is given by the following expression.

[Math. 4]

$$\hat{H} = HT \quad (3)$$

T is the unimodular matrix. The unimodular matrix is a matrix having a determinant of ±1, and having a complex number (also called Gaussian integer) in which the real part and the imaginary part are integers. As described above, in this embodiment, multiplying the first channel matrix H by a transform matrix T and hence transforming the first channel matrix H into the second channel matrix $\hat{H}$ are called a lattice-base reduction (LR) technology. The components of the transform matrix T are the most desirably Gaussian integers. However, the components may be any numbers that are classified into complex numbers if a change in transmission performance is allowed. Expression (1-1) can be deformed as follows by using Expression (3).

[Math. 5]

$$r = HTT^{-1}s + \eta \quad (1\text{-}2)$$
$$= \hat{H}\hat{s} + \eta$$

The spatial filtering can be performed while it is assumed that $\hat{H}$ is a channel matrix and $\hat{s}=T^{-1}s$ is a transmit signal vector. If $W=\hat{H}^{-1}$ is established, the spatial-demultiplexing-processing output is given by the following expression.

[Math. 6]

$$\hat{r} = \hat{H}^{-1}(HTT^{-1}s + \eta) \quad (2\text{-}3)$$
$$= \hat{s} + \hat{H}^{-1}\eta$$

$\hat{H}$ is the matrix having higher orthogonality than H. Accordingly, the noise enhancement hardly occurs as compared with Expression (2-2), and good transmission performances can be realized.

However, the spatial-demultiplexing-processing output $\hat{r}$ obtained by Expression (2-3) is a decision value for $\hat{s}$, but is not a decision value for s. Thus, processing of detecting s from $\hat{s}$ is required. The method of detecting s may be a method discussed in NPL 3 listed above, and the method is described below.

In the terminal device 95, quantization is performed on each component of $\hat{r}=[\hat{r}_1, \ldots, \hat{r}_{Nt}]^T$. In particular, all signal candidate points available for $\hat{s}=T^{-1}s$, which is obtained by multiplying the transmit signal s by the unimodular matrix T, are quantized to a signal candidate point being the closest to $\hat{r}_n$.

Figure 3:
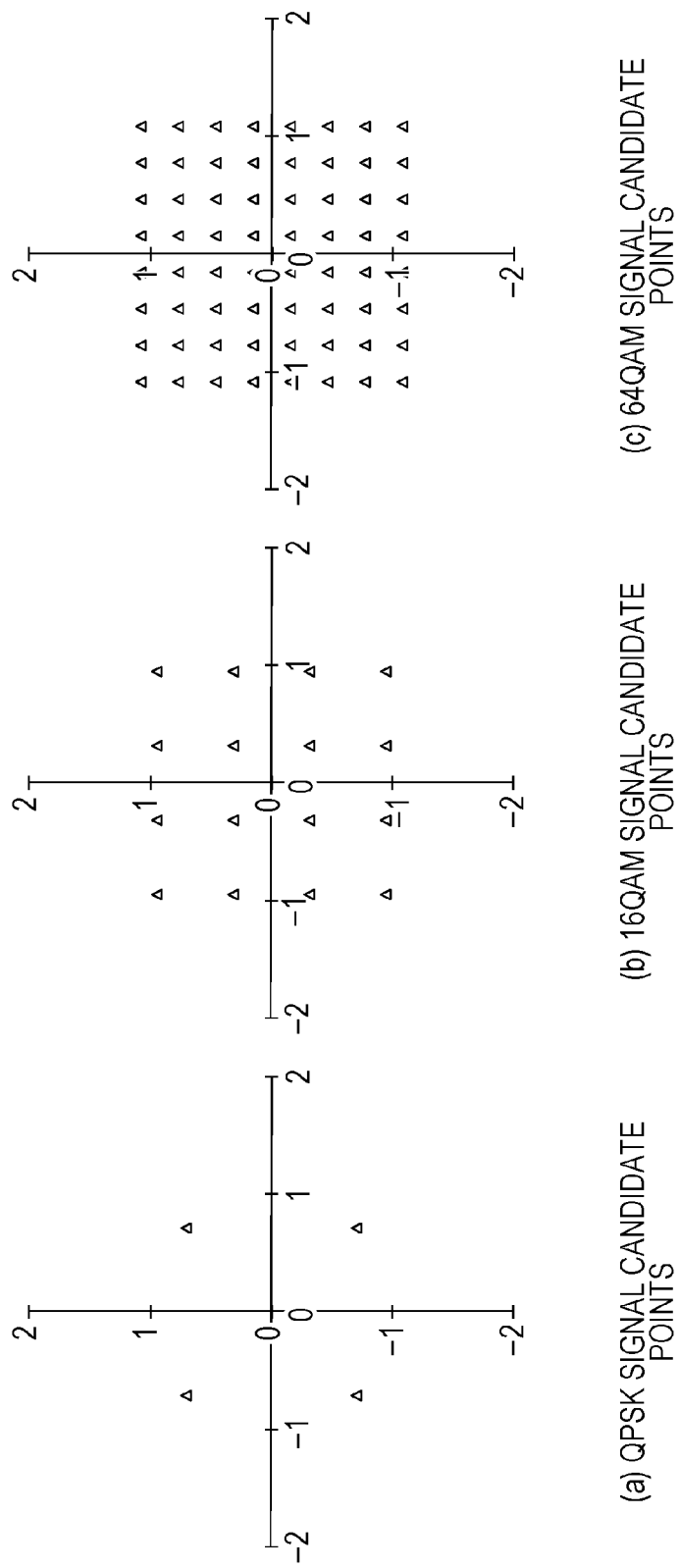
FIG. 3 is an illustration schematically showing signal candidate points.
Figure 4:
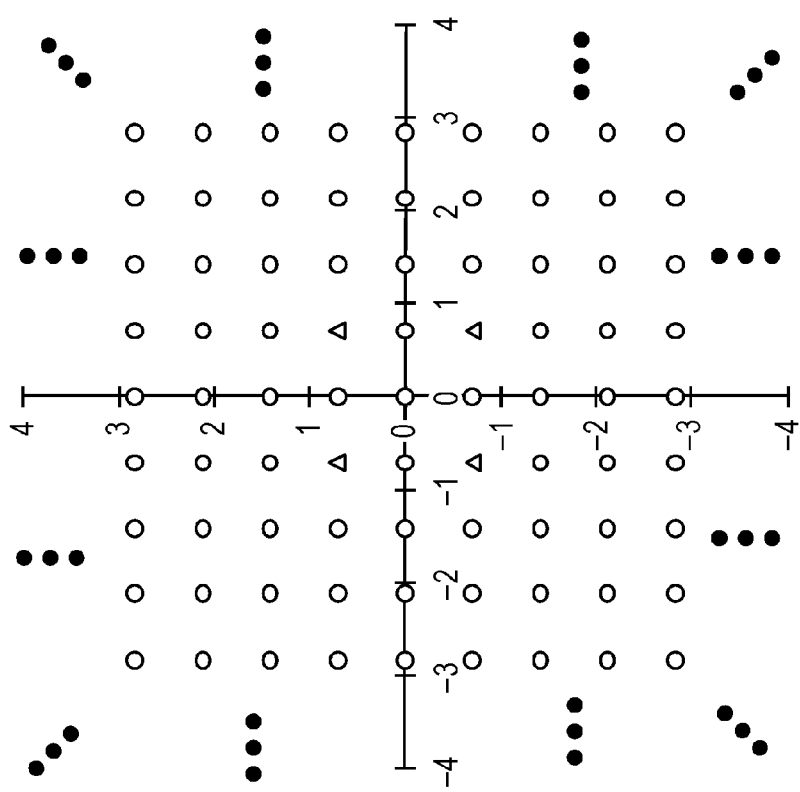
FIG. 4 is an illustration schematically showing signal candidate points.

Regarding data demodulation without the LR technology, for example, if QPSK modulation is used, from among 4 signal candidate points shown in FIG. 3(a), a signal candidate point with the minimum square Euclidean distance with respect to the spatial-demultiplexing-processing output is employed as a desirable signal point. In contrast, if the LR technology is used, since the signal candidate points are not 4 points but $\hat{s}=T^{-1}s$ multiplied by the unimodular matrix T is used, infinite signal candidate points are present (see FIG. 4). In FIG. 4, it is assumed that all data streams use the QPSK modulation.

Figure 5:
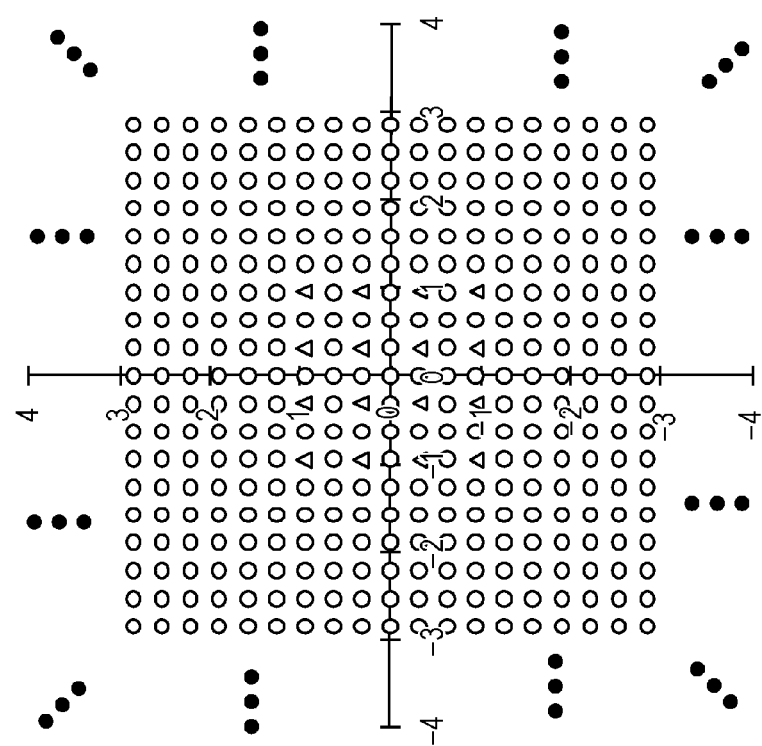
FIG. 5 is an illustration schematically showing signal candidate points.

FIG. 5 shows a case in which 16QAM is used. In the signal candidate points shown in FIGS. 4 and 5, a signal candidate point by an original modulation scheme is indicated by a white triangle, and other candidate point is indicated by a white circle (actually, not all signal points shown in FIGS. 4 and 5 are employed, and signal candidate points to be employed from these points depend on the matrix T calculated based on the channel matrix H).

From among the infinite signal candidate points, employing a point being the closest to the spatial-demultiplexing-processing output as a desirable signal point for $\hat{s}$ is quantization for the respective components of $\hat{r}$. Hence, the quantization is also called signal decision in a region of $\hat{s}$.

If the LR technology is used, since the infinite signal candidate points are present, detection of a desirable signal for $\hat{r}$ needs an enormous computation amount. However, it is found from FIG. 4 that the signal candidate points have regularity, and that intervals among the signal candidate points are each an integral multiple of $1/\sqrt{2}$ (in FIG. 5, an integral multiple of $1/\sqrt{10}$). This is because all the components of the unimodular matrix are Gaussian integers and all the data streams use the same modulation scheme. If the regularity for the signal candidate points is used, the quantization for $\hat{r}$ can be easily performed. As a specific method, the following value is defined first.

[Math. 7]

$$y = \left(\frac{1+j}{2}\right)T^{-1}1_{N_t \times 1} \quad (4)$$

Here, $1_{m \times n}$, denotes a matrix of m rows and n columns with all components being 1. It is assumed that the quantization output for $\hat{r}$ is $r_Q$. If y is used, $r_Q$ is given by the following expression.

[Math. 8]

$$r_Q = Q(\hat{r}) \quad (5)$$
$$= 2c\left(\text{round}\left(\frac{\hat{r}}{2c} - y\right) + y\right)$$

Here, round(x) is a function that sends back a Gaussian integer that is the closest to x. Also, c is a value determined by the modulation scheme. In case of QSPK, c is $1/\sqrt{2}$, and in case of 16QAM, $1/\sqrt{10}$ is set. Typically, c is set at a value that is ½ of an interval between neighboring signal candidate points. By multiplying the quantization output $r_Q$ by the unimodular matrix T, a decision value $\hat{s}''_Q$, which is not for s" but is for s, is calculated.

[Math. 9]

$$\hat{s}_Q = Tr_Q \quad (6)$$

$\hat{s}_Q$ which is finally calculated is output as the spatial-demultiplexing-processor output.

A decision value expressed by Expression (6) is a hard decision value. In the spatial demultiplexing processor, if iterative signal processing such as parallel interference cancellation is used instead of the spatial filtering, or if a code using a soft decision value for decoding, such as a turbo code is used in channel coding, a soft decision value has to be used as the decision value. A soft decision value can be also output by the method described in NPL 3.

The spatial filtering using the LR technology has been described above. Use of the spatial filtering as the spatial demultiplexing processing has been described; however, the LR technology can be used for MLD and the interference cancellation technology, which are spatial demultiplexing processing technologies other than the spatial filtering. Also, the LR technology can be used in case of precoding transmission, in which multiplication of the linear filter is previously performed in the base station device 90 and then transmission is performed.

The signals output from the spatial demultiplexing processor 956 by the above-described method are input to data demodulators 958, in which data demodulation is performed on the signals. Then, the signals are input to a parallel-serial converter 960, in which the data is converted into serial data. The parallel-serial-converter output is input to a channel decoder 962, in which channel decoding is performed. The channel-decoder output serves an estimated series in the terminal device of the desirable signal series.

Described above is the overview of the MIMO spatial multiplexing transmission using the LR technology. In the terminal device 95, the LR technology is used in the spatial demultiplexing processor 956 for detecting a desirable signal from signals which have spatially multiplexed and received. However, with the conventional spatial demultiplexing processing using the LR technology, the same data modulation scheme has to be performed for respective data streams. This is because, if different modulation schemes are used for the respective data streams, the regularity for all signal candidate points available for $\hat{s}=T^{-1}s$ (see FIGS. 4 and 5) may be disordered.

A signal point actually available for $\hat{s}$ is determined in accordance with T. Hence, not all signal candidate points in FIGS. 4 and 5 are available with any T. A subset of all signal candidate points is the available signal candidate points.

Regarding a specific example, it is assumed that the number of antennas of the base station device 90 and the terminal device 95 is 8. A unimodular matrix T is calculated from a channel matrix H at a certain time, and $\hat{s}$ is expressed by using the unimodular matrix T. Since 8-transmit and 8-receive is provided, 8 data streams in total can be transmitted. Now, FIG. 6 shows a state of $T^{-1}s$ if the QPSK modulation is used for all data streams, FIG. 7 shows a case in which the 16QAM modulation is used for all data streams, and FIG. 8 shows a case in which QPSK is used for 4 streams and 16QAM is used for the other 4 streams.

Figure 6:
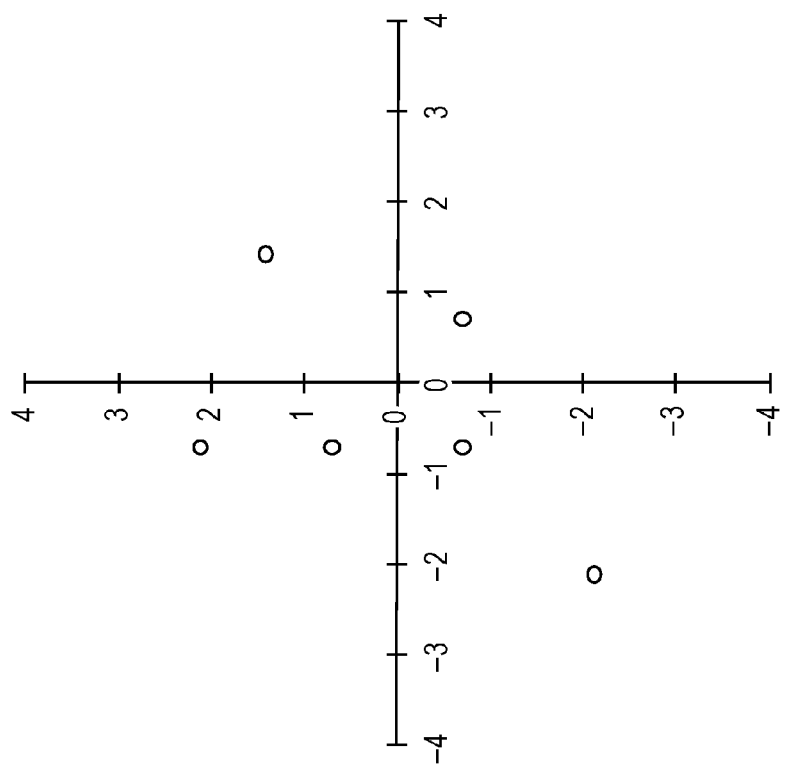
FIG. 6 is an illustration schematically showing signal candidate points.
Figure 7:
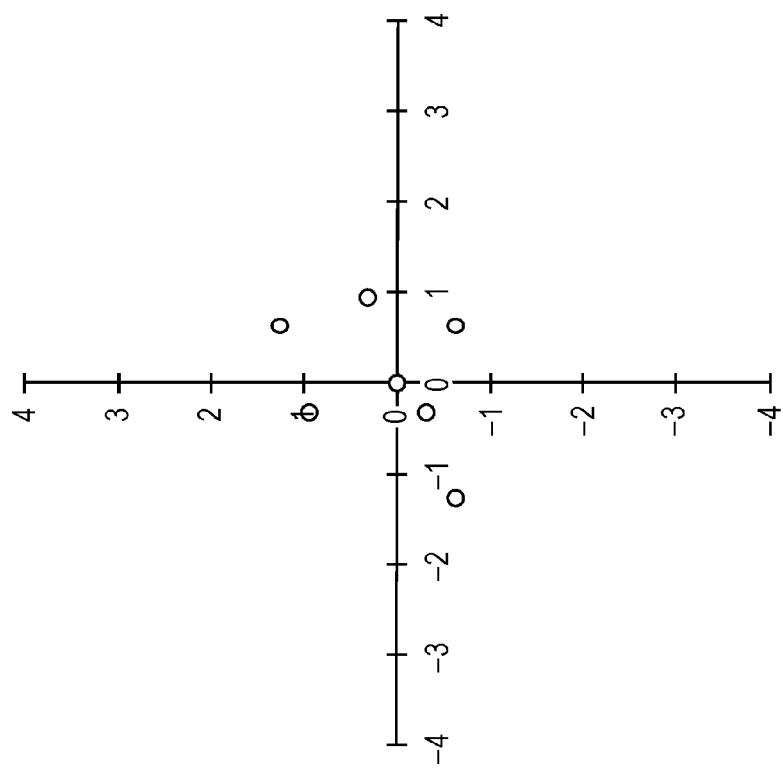
FIG. 7 is an illustration schematically showing signal candidate points.
Figure 8:
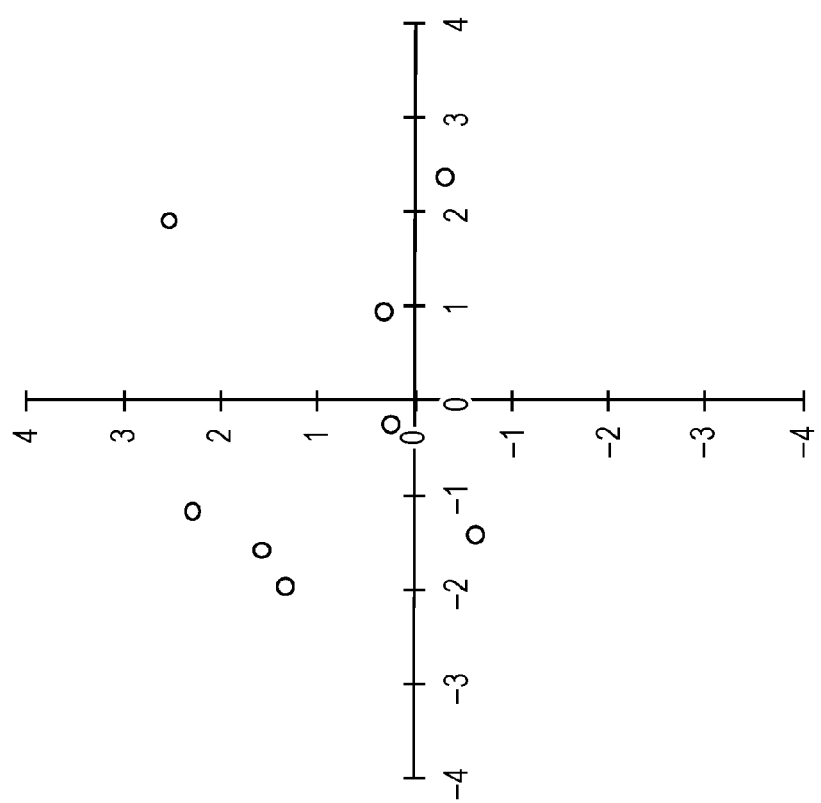
FIG. 8 is an illustration schematically showing signal candidate points.

It is found that $T^{-1}s$ shown in FIGS. 6 and 7 is aligned with one of the signal candidate points shown in FIGS. 4 and 5, but $T^{-1}s$ shown in FIG. 8 is not aligned with any of the signal candidate points in FIGS. 6 and 7.

This is because an interval between 2 neighboring signal points of QPSK is different from that of 16QAM. If the QPSK modulation and the 16QAM modulation are mixed as the modulation schemes applied to the spatially multiplexed data streams, since the number of signal candidate points available for $T^{-1}s$ is infinite and the distance between signal candidate points has no regularity, the quantization for $\hat{r}$ is impossible. Owing to this, if the LR technology is used, the same modulation scheme has to be used for the spatially multiplexed data steams.

However, this means that the adaptive modulation technology using different modulation schemes for respective streams cannot be applied. Therefore, this embodiment discloses a method of using different data modulation schemes for respective data streams while spatial demultiplexing processor using the LR technology is performed.

2. First Embodiment

A first embodiment, to which the invention is applied, is aimed at MIMO spatial multiplexing transmission in which a base station device including $N_t$ transmit antennas and a terminal device including $N_r$ receive antennas make communication.

Figure 10:
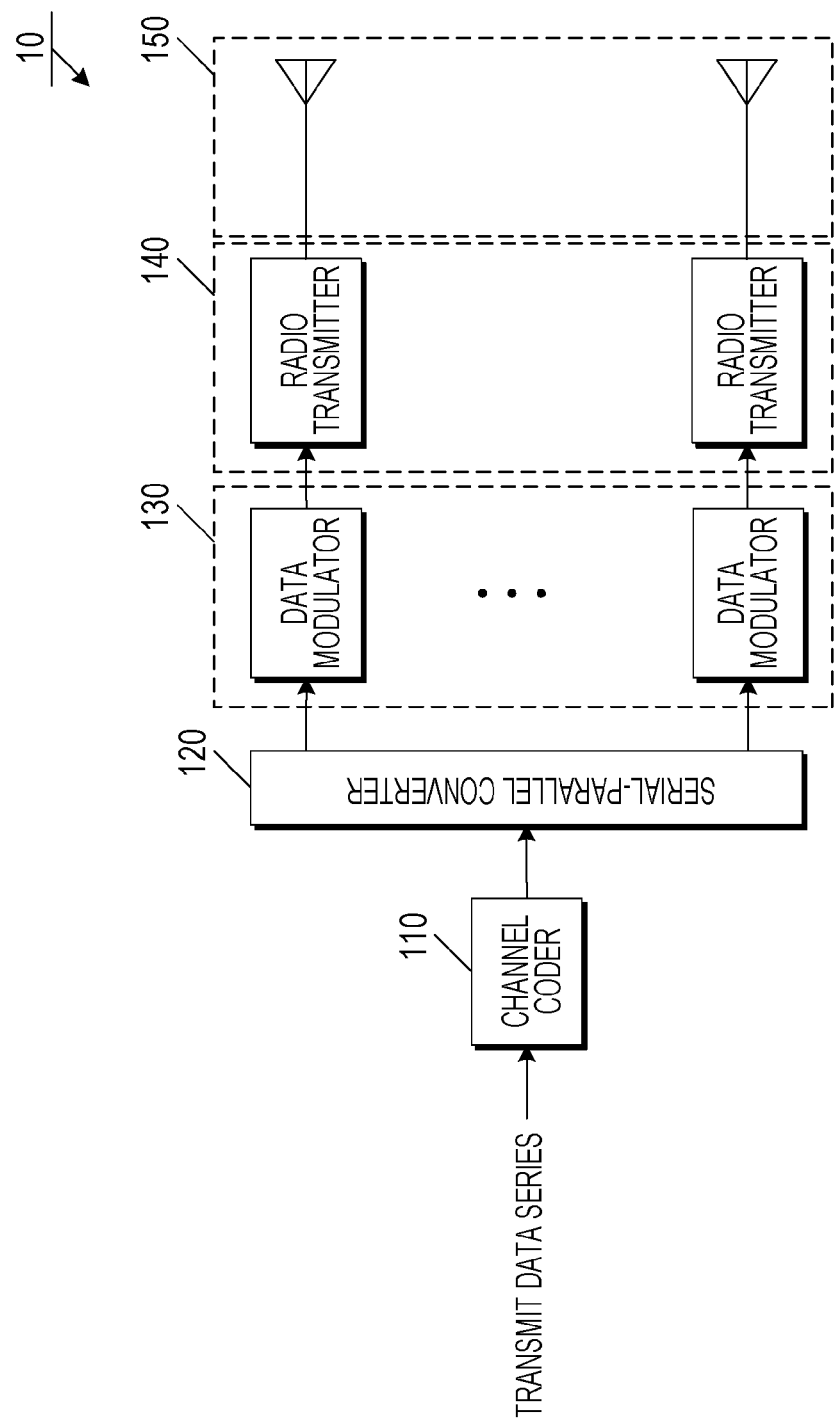
FIG. 10 is an illustration showing a configuration of a base station device according to a first embodiment.
Figure 11:
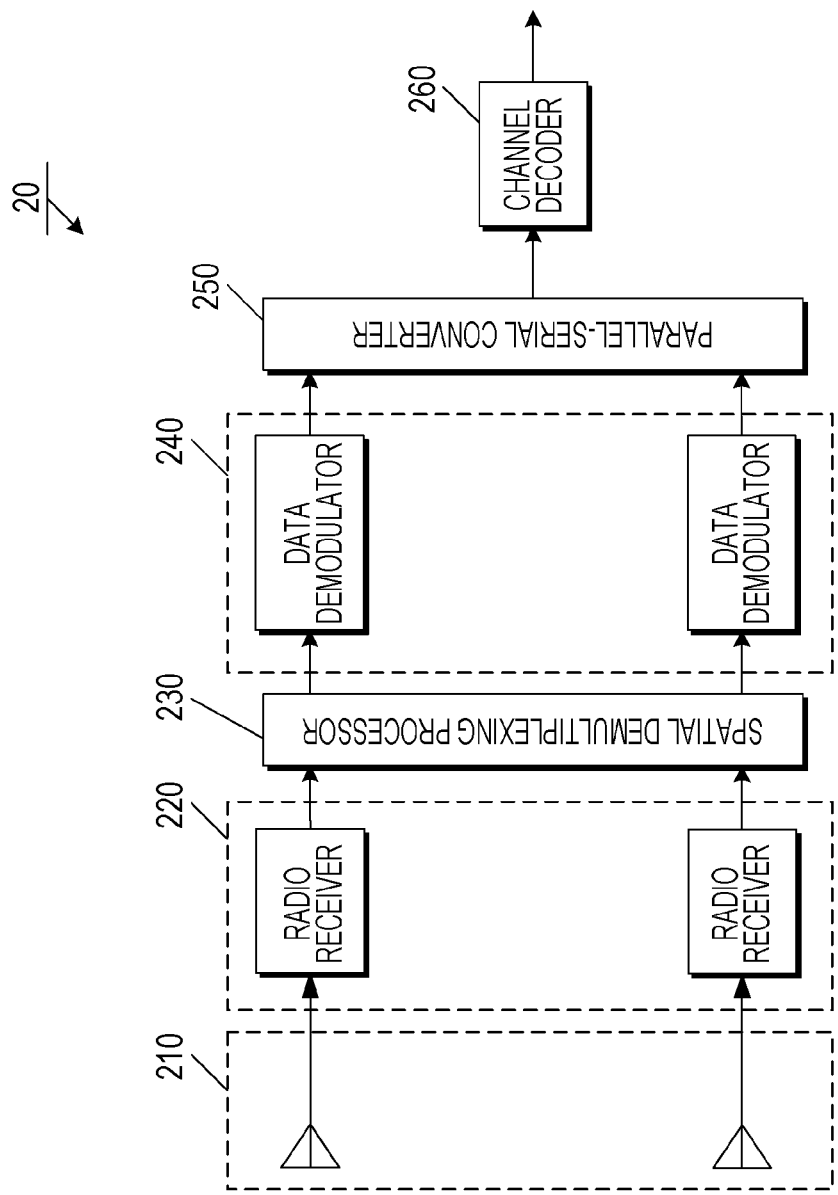
FIG. 11 is an illustration showing a configuration of a terminal device according to the first embodiment.

Here, FIG. 10 is a block diagram showing a configuration of a base station device 10. FIG. 11 is a block diagram showing a configuration of a terminal device 20. It is assumed that a transmitter (a base station device) transmits R data streams to a receiver (a terminal device). R has to satisfy $\min(N_r, N_r) \geq R$. Description is given below based on $R=N_t=N_r$.

FIG. 10 is an illustration showing the configuration of the base station device 10, and includes a channel coder 110, a serial-parallel converter 120, data modulators 130, radio transmitters 140, and antennas 150. Also, FIG. 11 is an illustration showing the configuration of the terminal device 20, and includes antennas 210, radio receivers 220, a spatial demultiplexing processor 230, data demodulators 240, a parallel-serial converter 250, and a channel decoder 260.

Here, signal processing in the respective configuration devices is substantially similar to the signal processing in the respective configuration devices (see FIGS. 1 and 2) in the MIMO spatial multiplexing transmission using the LR technology. Differences are the data modulators in the base station device, the spatial demultiplexing processor in the terminal device, and the data demodulators in the terminal device. Hereinafter, signal processing in these three configuration devices is mainly described.

2.1 Base Station

First, the configuration of the base station device is described. Signal processing in the data modulators 130 is described first. In the description relating to the MIMO spatial multiplexing transmission using the LR technology, it has been described that, in order to use the LR technology in the spatial demultiplexing processing, the regularity has to be present in the distances between all the signal candidate points available for $\hat{s}=T^{-1}s$ formed of the transmit signal vector s and the unimodular matrix.

However, this represents difficulty in adaptive modulation that has different frequency utilization efficiencies for respective data streams, or that uses modulation signals with different numbers of bits by which transmission can be made per unit frequency. Hence, this may limit the improvement in frequency utilization efficiency. Owing to this, this embodiment discloses a method of allowing the distances between all the signal candidate points available for $\hat{s}=T^{-1}s$ to have regularity even if any of orthogonal amplitude modulation schemes, such as QPSK and 16QAM, which are expected to be used in the adaptive modulation technology (QPSK is also classified into phase modulation schemes; however QPSK is defined as a type of orthogonal amplitude modulation schemes).

As the adaptive modulation technology, considered here is a case using the two modulation schemes of QPSK and 16QAM as the adaptive modulation technology. That is, QPSK is used for a stream with a low transmission quality, and 16QAM is used for a stream with a high transmission quality. Signal point arrangement diagrams of conventional QPSK and 16QAM are shown in FIG. 3. A signal-point interval is set such that an interval between 2 neighboring signal points under a condition of a constant transmit power becomes the largest.

The signal candidate points of $\hat{s}=T^{-1}s$ are randomly arranged as shown in FIG. 8 because the distance between the signal points of QPSK has no correlation to the distance between the signal points of 16QAM. Owing to this, in this embodiment, from among a plurality of modulation schemes used for the respective data streams, by using the signal candidate points used by a modulation scheme having the maximum modulation multilevel number (also called first data modulation scheme), the signal candidate points of a modulation scheme with a small multilevel number are determined.

In this embodiment, the signal candidate points of QPSK are determined by extracting 4 points from the 16 signal candidate points of 16QAM shown in FIG. 3(b).

An example of the extraction method may be a method shown in FIG. 12(a). Information of two bits may be assigned to each of the 4 points shown in FIG. 12(a). FIG. 12(a) shows an example if gray coding is used. At this time, the interval between neighboring signal candidate points is $\sqrt{2}$, which is not changed from the interval between neighboring signal candidate points of conventional QPSK.

The QPSK modulation scheme newly defined in the above description has different signal candidate points from those of the conventional QPSK modulation. Hence, the newly defined QPSK modulation may not be called QPSK modulation in a strict sense. However, for easier description, the modulation scheme that can achieve 2 bps/Hz as the frequency utilization efficiency is called QPSK modulation in the following description. Similarly, $2^J$QAM modulation that can transmit J bps/Hz as the frequency utilization efficiency is called similarly even if the signal candidate points differ from those of the conventional scheme, unless the frequency utilization efficiency which can be achieved is changed.

Figure 13:
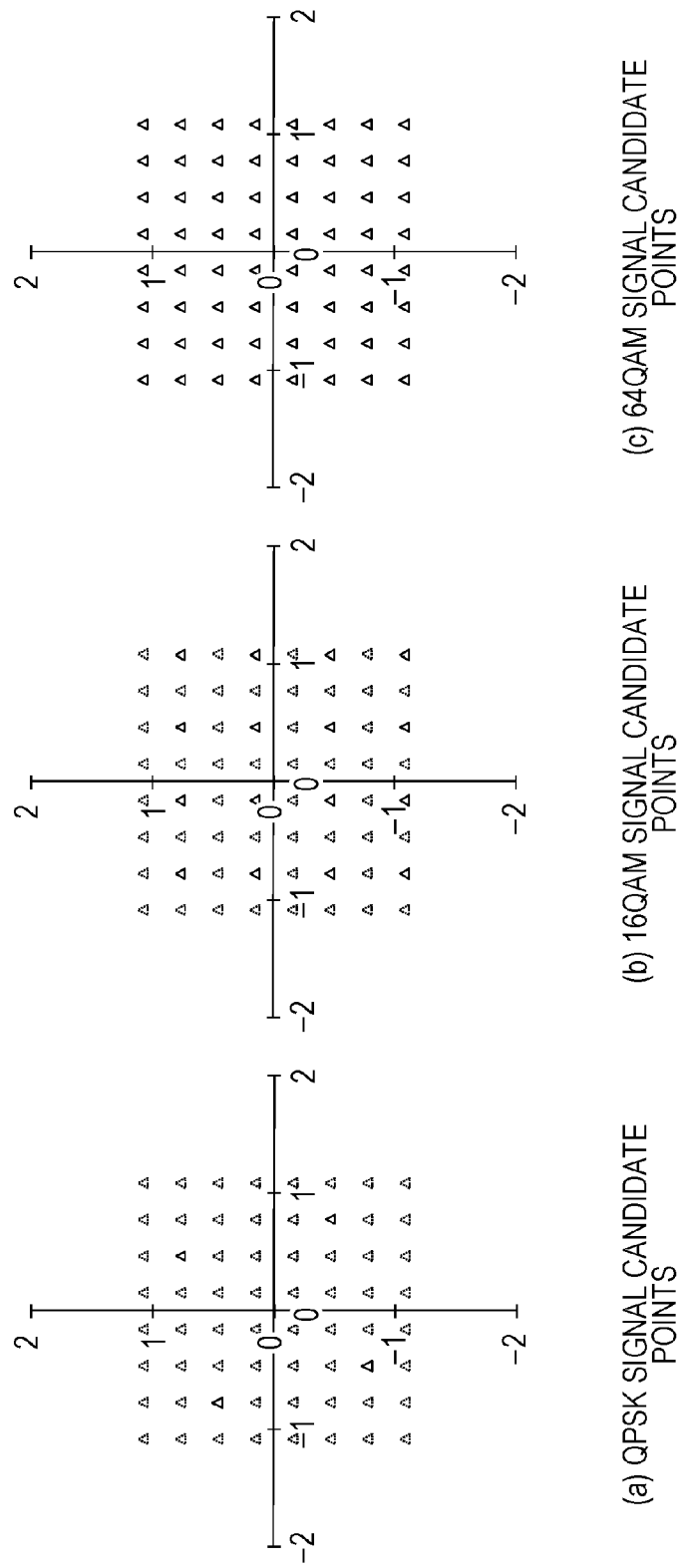
FIG. 13 is an illustration schematically showing signal candidate points.

Next, it is considered that QPSK, 16QAM, and 64QAM are used in a mixed manner as the adaptive modulation schemes. At this time, since the first modulation scheme is 64QAM available for transmission by 6 bps/Hz, 16 signal points may be extracted from 64 signal candidate points owned by 64QAM to provide the modulation scheme corresponding to 16QAM, and 4 points may be extracted to provide the modulation scheme corresponding to QPSK. FIG. 13 shows an example of the extraction method. Information may be assigned to each of the extracted signal candidate points. Two bits may be assigned to the modulation scheme corresponding to QPSK, and four bits may be assigned to the modulation scheme corresponding to 16QAM.

Hereinabove, the specific examples of the modulation schemes used in the first embodiment are described. Typically, in an orthogonal amplitude modulation scheme available for transmission by J bps/Hz, $2^J$ signal candidate points are present. Therefore, in the modulation schemes expected to be used in the adaptive modulation technology, from among the signal candidate points owned by the modulation scheme with the maximum modulation multilevel number, the new modulation scheme defined by extracting the K signal candidate points may be used as the modulation scheme available for transmission by $(\log_2 K)$ bps/Hz.

In the data modulator 130 of the base station device 10, the above-described modulation schemes are applied to the respective data streams in accordance with the receive quality of the terminal device 20. Signal processing in the configuration devices other than the data modulator 130 is similar to that of the MIMO spatial multiplexing transmission using the LR technology, and hence the description is omitted.

2.2 Terminal Device

Next, the terminal device 20 is described. In the terminal device 20, signal processing in a spatial demultiplexing processor 230 and data demodulators 240 differs from that of the MIMO spatial multiplexing transmission using the LR processing; however, since signal processing in other configuration devices is the same, and the description is omitted.

In the spatial demultiplexing processor 230, application of the LR technology and multiplication of the linear filter are performed like the MIMO spatial multiplexing transmission using the LR technology, and a soft decision value r̂ corresponding to ŝ=T⁻¹ s is calculated. Then, quantization is performed like the related art. At this time, quantization for r̂ is performed while it is assumed that the modulation scheme with the maximum modulation multilevel number is used for all the data streams, from among the modulation schemes used in the adaptive modulation technology.

For example, if QPSK and 16QAM are used for adaptive modulation, 16QAM may serve as a reference, i.e., in Expression (5), the value of c value may be set at $1/\sqrt{10}$. In the data modulator 130 of the base station device 10, as long as the data modulation is performed as described above, even if the QPSK modulation and the 16QAM modulation are mixed, a signal point available for ŝ=T⁻¹'s may be one of the signal candidate points shown in FIGS. 5 and 7.

Figure 12:
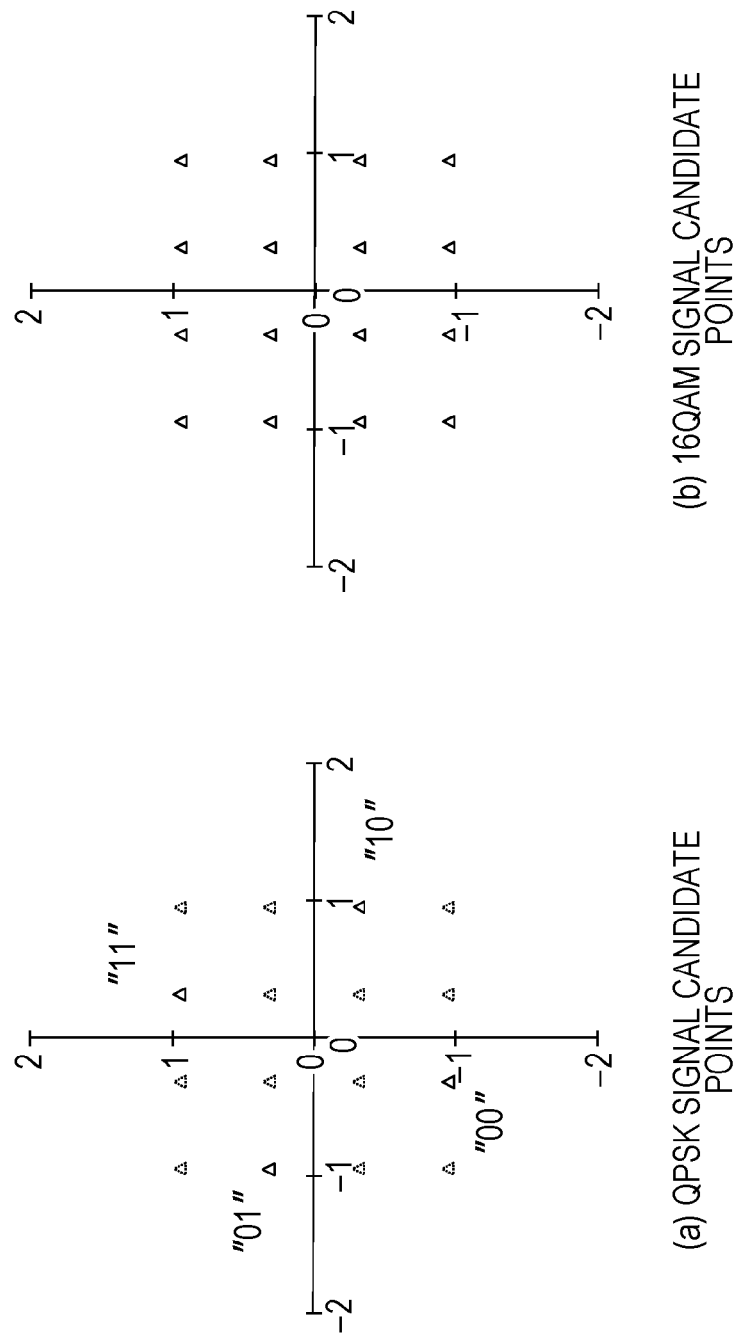
FIG. 12 is an illustration schematically showing signal candidate points.

The spatial-demultiplexing-processor outputs are input to the data demodulators 240 of the respective data streams. In each of the data demodulators 240, data demodulation is performed based on the modulation scheme that is actually used for the corresponding data stream. A reference at this time may be a signal candidate point defined by a signal candidate point extracted from signal candidate points of the modulation scheme with the maximum multilevel modulation as shown in FIGS. 12 and 13. The data modulation method may be that, for example, in each data demodulator, a signal candidate point with the minimum square Euclidean distance may be extracted for a soft decision value input from the signal demultiplexing processor, and may be detected as desirable data.

Signal processing in the terminal device 20 is similar to that of the MIMO spatial multiplexing transmission using the LR technology, except the spatial demultiplexing processor 230 and the data demodulators 240, and hence the description is omitted.

It is to be noted that, in this embodiment, a wireless communication scheme is not particularly limited. The description is aimed at narrow-band transmission. However, for example, the invention may be applied to an orthogonal frequency division multiplexing access (OFDMA) scheme that is employed in downlink transmission of LTE. In this case, the invention may be applied to each sub-carrier, or the invention may be applied to each resource block that is a group of a plurality of sub-carriers. Alternatively, the invention may be applied to a single-carrier-based access scheme, such as single carrier frequency division multiplexing access (SC-FDMA).

In the first embodiment, in the MIMO transmission in which the LR technology is used for the spatial demultiplexing processing, the data modulation scheme that can use the adaptive modulation technology using the different modulation schemes for the respective data streams is described.

With this embodiment, even in case of the MIMO transmission using the LR technology in the spatial demultiplexing processing, since the different modulation schemes can be used for the respective data streams, this embodiment can contribute to improvement in frequency utilization efficiency of the wireless communication system.

3. Second Embodiment

The first embodiment is aimed at the MIMO transmission between the base station device including the plurality of transmit antennas and the terminal device including the plurality of receive antennas by one-to-one correspondence. Such MIMO transmission is called single user MIMO (SU-MIMO) transmission.

Meanwhile, the maximum frequency utilization efficiency that can be provided by the MIMO transmission is proportional to a smaller value of the $N_t$ transmit antennas and the $N_r$ receive antennas included in the wireless system. However, since the number of antennas that can be arranged in the terminal device is limited, the frequency utilization efficiency that can be achieved by the SU-MIMO transmission is also limited.

Owing to this, multi-user MIMO (MU-MIMO) transmission is becoming popular, in which the MIMO transmission is performed while a plurality of terminal devices are assumed as a large-scale antenna array. In the downlink MU-MIMO transmission, if precoding processing, in which spatial demultiplexing processing is previously performed in the base station device, is performed, good transmission performances can be provided. At this time, if the LR technology is used, the spatial demultiplexing processing performance can be markedly improved.

The second embodiment is aimed at the downlink MU-MIMO transmission that performs the precoding using the LR technology, and it is considered that the adaptive modulation technology using different modulation schemes for the respective terminal devices is used.

In the second embodiment, it is considered that U terminal devices each having one receive antenna are connected with a base station device 12 having $N_t$ transmit antennas. Description is given based on $N_t=U$; however, each terminal device may have a plurality of receive antennas, or even if each terminal device performs transmission with rank 2 or higher, such a configuration is included in this embodiment.

3.1 Base Station

Figure 14:
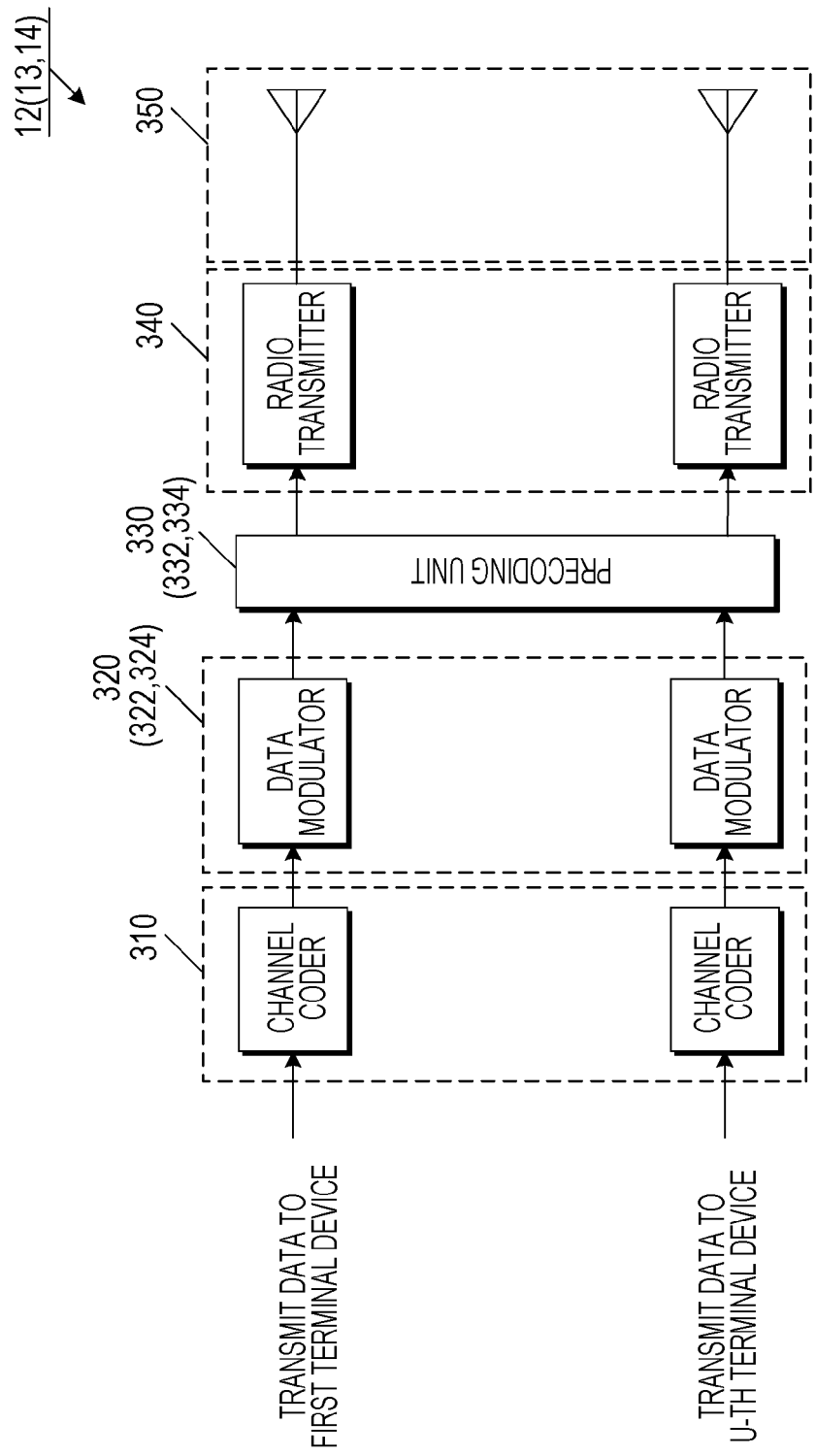
FIG. 14 is an illustration showing a configuration of a base station device according to second to fourth embodiments.

FIG. 14 shows a configuration of the base station device 12 according to the second embodiment. As shown in FIG. 14, the base station device 12 includes channel coders 310, data modulators 320, a precoding unit 330, radio transmitters 340, and antennas 350.

Transmit data for respective users is input to the channel coders 310 and the data modulators 320, in which channel coding and data modulation are performed. It is assumed that channel coding rates and data modulation schemes applied to the transmit data for the respective users are already determined based on control information associated with receive qualities of the respective users previously notified from the respective users. The detail of signal processing in the data modulators 320 is described later. The data-modulator outputs are input to the precoding unit 330.

In the downlink MU-MIMO transmission, the transmit data for the respective users is spatially multiplexed and transmitted from the base station device 12. Hence, each terminal device may receive data for the own device and also data for other terminal device, as an interference signal. The precoding unit 330 performs signal processing on the transmit signals so that the respective terminal devices can detect desirable signals.

The signal processing performed in the precoding unit 330 is described. A transmit signal vector $s=[s_1, \ldots, s_U]^T$, elements of which are transmit data $\{s_u; u=1 \text{ to } U\}$ for the respective users, is input to the precoding unit 330. In the precoding unit 330, the transmit signal vector is multiplied by a linear filter matrix W, and hence coding transmit signals x=Ws are generated. The linear filter matrix W may be calculated by any of various methods. In the following description, it is assumed that a linear filter based on the ZF criteria, in which an interference signal power to be received by each terminal device is 0, is used.

The ZF linear filter is calculated based on the channel matrix H that is formed of a complex channel gain between the base station device 12 and each terminal device. Herein, the channel matrix is defined by the following expression.

[Math. 10]

$$H = \begin{pmatrix} h_{1,1} & \cdots & h_{1,N_t} \\ \vdots & \ddots & \vdots \\ h_{U,1} & \cdots & h_{U,N_t} \end{pmatrix} \quad (7)$$

Herein, $h_{u,n}$ denotes a complex channel gain between an n-th transmit antenna (n=1 to $N_t$) of the base station device 12 and a u-th terminal device (u=1 to U). The ZF linear filter $W_{ZF}$ is defined by an inverse matrix of H, and hence, $W=H^{-1}$ is established. If the number of transmit antennas differs from the number of terminal devices, H is not a square matrix. The ZF linear filter $W_{ZF}$, is defined as a generalized inverse matrix of H.

As described above, in the precoding unit 330, the base station device 12 has to previously recognize channel state information with respect to each terminal device. The method by which the base station device 12 recognizes the channel state information may be a method in which each terminal device estimates channel state information by a known reference signal sequence transmitted from the base station device, and the terminal device notifies the base station device 12 about the information.

At this time, the method of transmitting the reference signal sequence is the same as the transmitting method according to the first embodiment (however, the receive antenna in the first embodiment is the terminal device in the second embodiment). Also, there is a method in which the base station device 12 makes an estimation based on a transmit signal (uplink signal) from a terminal device 22. Description is given below based on that the base station device 12 has ideally recognized the channel state information.

The precoding unit 330 performs power normalization that causes a transmit power to be constant for a coding transmit signal x. The power normalization is performed by multiplication by a power normalization coefficient β, and the coding transmit signal after the power normalization is expressed by x=βWs. There are some calculation methods for the power normalization coefficient. However, it is assumed that a power normalization coefficient that causes a mean transmit power to be constant is used. At this time, β is given by the following expression.

[Math. 11]

$$\beta = \sqrt{\frac{U}{tr(WE[ss^H]W^H)}} \quad (8)$$

Herein, $A^H$ denotes an adjoint matrix of a matrix A. Also, tr(A) denotes trace computation for the matrix A. Also, E[X] denotes an ensemble average for a random variable X.

Assuming that x=βWs, a case of transmission from the base station device 12 is considered. If a receive signal observed in the u-th terminal device is $r_u$, the receive signal vector $r=[r_1, \ldots, r_U]^T$ is given by the following expression.

[Math. 12]

$$r = Hx + \eta = \beta HWs + \eta = \beta s + \eta \quad (9\text{-}1)$$

Referring to Expression (9-1), it is found that each terminal device can receive only transmit data for the own device.

However, the receive SNR of the receive signal for each terminal device expressed by Expression (9-1) is proportional to the power normalization term β. As expressed in Expression (8), β depends on W calculated from the channel matrix H, and if the channel matrix H has low orthogonality, the value of β becomes markedly small. This represents that the receive SNR is decreased, resulting in a degradation in transmission quality.

Owing to this, like the first embodiment, application of the LR technology to the channel matrix H is considered. With the application of the LR technology, the orthogonality of the channel matrix H is maintained, and hence the receive SNR can be prevented from being decreased.

In the second embodiment, the LR technology is applied to an adjoint matrix $H^H$ of the channel matrix H. If $\hat{H}$ denotes the channel matrix with the orthogonality improved, $\hat{H}$ can be expressed by $H^H = H^H T$. Hence, the channel matrix applied with the LR technology is expressed by $\hat{H} = T^H H$. Since T is a unimodular matrix, an adjoint matrix $T^H$ of T is also a unimodular matrix. Description is given below while $T^H$ is newly defined as T (i.e., $\hat{H} = TH$). If the relationship is used, Expression (9-1) can be expressed by the following expression.

[Math. 13]

$$\begin{aligned} r &= \beta HWs + \eta \\ &= \beta T^{-1} THWs + \eta \\ &= \beta T^{-1} \hat{H} Ws + \eta \end{aligned} \quad (9\text{-}2)$$

The linear filter W may use the inverse matrix $\hat{H}^{-1}$ of the channel matrix $\hat{H}$ applied with the LR technology. Hence, the probability of a decrease in power normalization coefficient is decreased. By substituting $W=\hat{H}^{-1}$ into Expression (9-2), $r=\beta T^{-1}$ s (noise term is omitted) is established. However, in this state, each terminal device may receive a transmit signal for other terminal device as an interference.

Owing to this, in the precoding of the base station device 12, the precoding is performed while Ts, which is obtained by multiplying an original transmit signal s by the unimodular matrix T, is recognized as a transmit signal. By replacing s with Ts, Expression (9-2) becomes r=βs, and each terminal device can detect only a desirable signal.

However, if Ts is the transmit signal, transmit power may be increased. This is because, as shown in FIG. 6 and other drawing, the signal point of Ts extends in the entire signal point region. Therefore, in the downlink MU-MIMO using the LR technology, modulo arithmetic is performed on Ts to prevent an increase in transmit power.

Modulo arithmetic $\text{Mod}_M(x)$ causes the output of an input x to be larger than −M and equal to or smaller than M. Herein, M is called Modulo width, which is set in accordance with a performance of a signal to be input. For example, if a QPSK modulation signal is input, M=√2 is set. Description is given below based on that all signals forming the transmit signal vector s are modified by the QPSK modulation.

It is assumed that $\hat{s}=Ts$, and $\hat{s}=[\hat{s}_1, \ldots, \hat{s}_U]^T$. If the modulo arithmetic is performed on $\hat{s}_u$, the output is given by the following expression.

[Math. 14]

$$\text{Mod}_M(\hat{s}_u) = \hat{s}_u - 2M \cdot \text{floor}\left(\frac{\text{Re}(\hat{s}_u)}{2M} + \frac{1}{2}\right) - \quad (10\text{-}1)$$
$$j2M \cdot \text{floor}\left(\left(\frac{\text{Im}(\hat{s}_u)}{2M} + \frac{1}{2}\right)\right)$$
$$= \hat{s}_u + 2Mz_{t,u}$$

Herein, floor(x) is a function that sends back the maximum integer that is no larger than a real number x, and is also called floor function. Also, Re(c) and Im(c) are functions that respectively send back the real number and the imaginary number of a complex number c. $2Mz_{t,u}$ denotes a second term and later of a first expression of Expression (10-1), and is called equal expression of the modulo arithmetic, or perturbation vector. It is to be noted that $Z_{t,u}$ is a Gaussian integer.

By performing the modulo arithmetic, the amplitude of $\hat{s}=Ts$ is within certain values even if $\hat{s}=Ts$ is multiplied by any unimodular matrix T. Hence, a rapid increase in transmit power does not occur. By substituting a transmit signal vector $\hat{s}_M = [\hat{s}_1, \ldots, \hat{s}_U]^T = \hat{s} + 2Mz_t$, which uses the modulo-arithmetic output expressed by Expression (10-1) as an element, into a part of s of a receive signal expressed by Expression (9-2), the following expression is obtained.

[Math. 15]

$$r = \beta HW\hat{s}_M + \eta \quad (9\text{-}3)$$
$$= \beta T^{-1}THW(Ts + 2Mz_t) + \eta$$
$$= \beta s + \beta 2MT^{-1}z_t + \eta$$

The normalization with the power normalization coefficient is performed on the signal received by each terminal device, and then the same modulo arithmetic as that performed in the base station device 12 is performed on the signal.

[Math. 16]

$$\text{Mod}_M(r/\beta) = s + 2MT^{-1}z_t + 2Mz_r + \eta/\beta \quad (10\text{-}2)$$

Herein, T denotes the unimodular matrix, and a component of $z_t$ is a Gaussian integer. Hence, all components of $T^{-1}z_t$ are Gaussian integers. Owing to this, if the influence of a noise is small, the modulo arithmetic provides $T^{-1}z_t + z_r \approx 0$. In all the terminal devices, only desirable signals can be detected.

Based on the above description, the signal processing in the precoding unit 330 of the base station device 12 is reviewed. The precoding unit 330 applies the LR technology first to the channel matrix H with respect to the terminal device, and obtains the unimodular matrix T. Then, the linear filter W is calculated based on the channel matrix H^ applied with the LR technology. Then, the input transmit signal vector s is multiplied by the unimodular matrix T, and then the modulo arithmetic is performed. Then, the transmit signal vector with the modulo arithmetic performed is multiplied by the linear filter W and the power normalization coefficient β, and hence the precoding-unit output $s_p$ is output. $s_p$ is given by the following expression.

[Math. 17]

$$s_p = \beta W(Ts + 2Mz_t) \quad (11)$$

Referring back to FIG. 14, the precoding-unit outputs are input to the radio transmitters 340 of the transmit antennas, which handle the outputs after the precoding unit. In the radio transmitters 340, the transmit signals in the baseband are converted into transmit signals in the radio-frequency (RF) band. Output signals of the radio transmitters are transmitted from the respective transmit antennas 350.

Signal processing in the precoding unit 330 is described, and then, signal processing in the data demodulators 320 of the base station device 12 is described. If the precoding using the LR technology is performed, to prevent an increase in transmit power, the modulo arithmetic has to be performed on the signal vector s^=Ts, which is obtained by multiplying the transmit signal vector s by the unimodular matrix T.

Meanwhile, the modulo width, which is one of parameters for the modulo arithmetic, is determined based on the modulation scheme of the signal to be input. It is known that the optimal modulo width is an integral multiple of the distance between the signal candidate points (see FIG. 3) of each modulation scheme.

For example, in case of QPSK, the modulo width is $\sqrt{2}$ ($=1 \times \sqrt{2}$). In case of 16QAM, the modulo width is $4/\sqrt{10}$ ($=2 \times 2/\sqrt{10}$). In case of 64QAM, the modulo width is $8/\sqrt{42}$ ($=4 \times 2/\sqrt{42}$). Hence, the modulo width is determined based on the modulation scheme of the signal to be input.

Meanwhile, in the downlink MU-MIMO transmission, the receive qualities of the concurrently connected terminal devices individually vary, and hence, the use of the adaptive modulation technology that selects the optimal modulation schemes in accordance with the receive qualities of the respective terminal devices is effective for improvement in frequency utilization efficiency.

However, the use of the different modulation schemes for transmit data for the respective terminal devices represents that the transmit signal vector s input to the precoding unit 330 is formed of different modulation signals. Typically, the modulo width used for the modulo arithmetic has an optimal value for each modulation symbol. Hence, if the transmit signal vector S is formed of the different modulation signals, the optimal modulo arithmetic may not be performed on part of the modulation symbols. If the modulo width is smaller than the optimal modulo width, a decision error for a receive signal may increase.

In contrast, if the modulo width is set at a value larger than the optimal value, this setting may result in an increase in required transmit power. Thus, the transmission quality is degraded. For example, in case that a QPSK modulation symbol and a 16QAM modulation symbol are mixed, if an optimal value for 16QAM is used as the modulo width, the modulo width of QPSK is smaller than an optimal value, and the receive quality of the QPSK modulation symbol may be decreased.

Owing to this, the data modulators 320 of the base station device 12 according to the second embodiment use another modulation scheme that is different from the modulation signals of conventional QPSK, 16QAM, etc. Specifically, the data modulation method targeted in the first embodiment may be used.

In either case, the modulo width of the modulo arithmetic performed by the precoding unit 330 may be an optimal modulo width in the modulation scheme with the maximum modulation multilevel number from among a plurality of modulation schemes used in the adaptive modulation technology. For example, if the QPSK modulation or the 16QAM modulation is used for transmit data for each terminal device, the modulo width may be set at $4/\sqrt{10}$ that is an optimal value for the 16QAM modulation.

The precoding unit 330 targeted in the above description performs the precoding using the linear filter W which is calculated based on the channel matrix H^ applied with the LR technology. The adaptive modulation technology targeted in this embodiment may be applied even if other type of precoding using the LR technology is performed.

As the precoding scheme in this case may be a non-linear precoding technology, such as Tomlinson-Harashima-precoding (THP) or a vector perturbation (VP) technology that provides the best power efficiency in the downlink MU-MIMO transmission by searching and applying an optimal perturbation vector.

THP and VP are non-linear precoding technologies performed based on the channel matrix H and the transmit signal vector s. By assuming H^ applied with the LR technology as the channel matrix and by applying THP or VP, improvement in transmission quality and a decrease in computation amount are expected. In case that the LR technology is used for the non-linear precoding, if the method targeted in the first embodiment is used for the data modulation scheme, the adaptive modulation technology in which different modulation schemes are used for the transmit data for the respective users can be used.

3.2 Terminal Device

Figure 15:
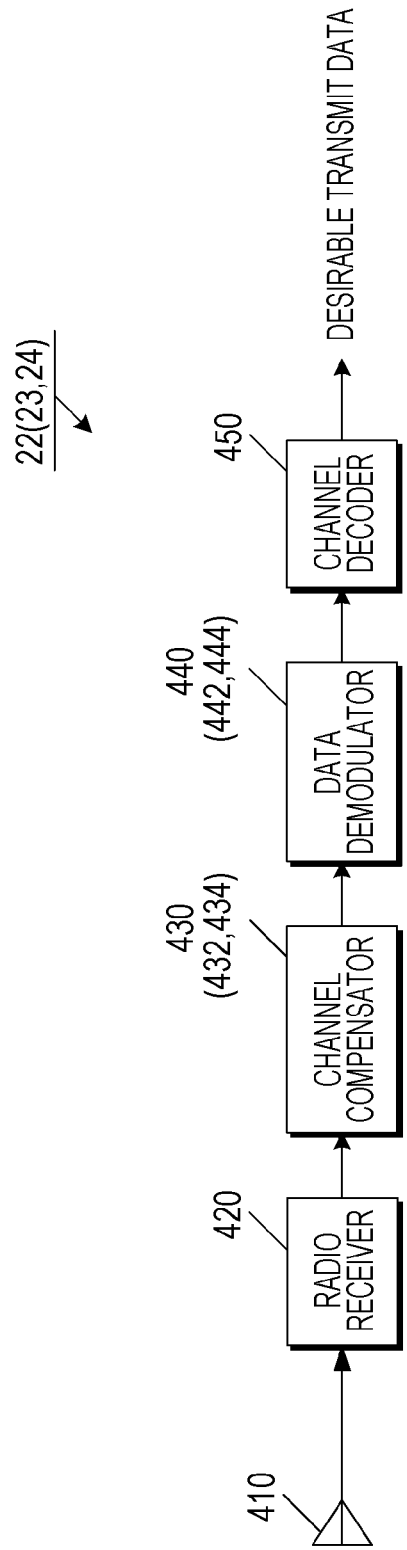
FIG. 15 is an illustration showing a configuration of a terminal device according to the second to fourth embodiments.

FIG. 15 shows the device configuration of the terminal device 22 according to the second embodiment. In the terminal device 22, a signal received by an antenna 410 is input to a corresponding radio receiver 420, in which the signal is converted into a signal in a baseband. The signal converted into the signal in the baseband is input to a channel compensator 430.

The channel compensator 430 performs normalization on the input receive signal by the power normalization coefficient. Then, the modulo arithmetic is applied, and the channel-compensator output is generated. At this time, regarding the modulo width, an optimal modulo width for the modulation scheme with the maximum modulation multilevel number in the adaptive modulation technology may be used.

The channel-compensator output is input to a data demodulator 440. The data demodulator 440 performs data demodulation based on the data modulation method in the data modulator 320 of the base station device 12.

For example, if the base station device 12 uses the modulation scheme targeted in the first embodiment, the data demodulation is performed based on this scheme. The modulation scheme used in the wireless communication system may be previously determined between the base station device 12 and the terminal device 22.

The data-demodulator output is input to a channel decoder 450, in which channel decoding is applied, and desirable data for each terminal device is generated.

With this embodiment, even in the downlink MU-MIMO transmission using the precoding with the LR technology, the adaptive modulation technology that applies the different modulation schemes to the transmit data for the respective terminal devices can be used. Hence, this embodiment can contribute to further improvement in frequency utilization efficiency in the downlink MU-MIMO transmission.

4. Third Embodiment

The second embodiment has been aimed at the downlink MU-MIMO transmission that performs the precoding based on the LR technology in the base station device, and the method of applying the adaptive modulation technology that applies the different modulation schemes for the respective users has been disclosed. In the downlink MU-MIMO, the modulation scheme has to be changed so that the base station device can properly perform the modulo arithmetic that restricts an increase in transmit power.

In the third embodiment, a method of allowing the adaptive modulation technology to be performed in the downlink MU-MIMO transmission that performs the precoding based on the LR technology, by a data modulation method different from the method targeted in any of the first and second embodiments.

In the third embodiment, like the second embodiment, it is considered that U terminal devices 23 each having one receive antenna are connected with a base station device 13 having $N_t$ transmit antennas. Description is provided based on $N_t=U$. However, the number of transmit antennas may differ from the number of concurrently connected terminal devices. It is to be noted that transmit data for each terminal device is called data stream.

The base station device 13 and a terminal device 23 according to the third embodiment are described with reference to FIGS. 14 and 15. Signal processing in respective configuration devices is substantially similar to the signal processing in the respective configuration devices according to the second embodiment.

Different points are data modulators 322 and a precoding unit 332 in the base station device 13, and a channel compensator 432 and a data demodulator 442 in the terminal device 23. Hereinafter, signal processing in these four configuration devices is mainly described.

4.1 Base Station

First, a configuration of the base station device 13 is described. For the base station device 13, the signal processing in the data modulators 322 is described first. In the description of the first and second embodiments, it has been described that, in order to use the LR technology in the spatial demultiplexing processing, the regularity has to be present in the distances between all the signal candidate points available for $s\hat{}=T^{-1}s$ formed of the transmit signal vector s and the unimodular matrix. In the first and second embodiments, for the data modulation scheme, the target method has defined the new modulation scheme from among the plurality of modulation schemes used in the adaptive modulation technology, based on the signal candidate points owned by the modulation scheme with the maximum multilevel number. Disclosed in the third embodiment is a method of adaptive modulation in the MIMO transmission using the LR technology by adjusting a signal-point interval of a modulation scheme used in conventional radio transmission.

As the adaptive modulation technology, considered first is the two modulation schemes of QPSK and 16QAM as the adaptive modulation technology. 4 signal candidate points $Q_4$ of conventional QPSK are given by the following expression.

[Math. 18]

$$Q_4\epsilon\{1/\sqrt{2}+j/\sqrt{2},-1/\sqrt{2}+j/\sqrt{2},1/\sqrt{2}-j/\sqrt{2},-1/\sqrt{2}-j/\sqrt{2}\} \qquad (12)$$

The distance between signal candidate points of QPSK is $\sqrt{2}$. In contrast, 16 signal candidate points $Q_{16}$ of 16QAM are given by the following expression.

[Math. 19]

$$Q_{16}\epsilon\{x/\sqrt{10}+jy/\sqrt{10}; x\epsilon\{-3,-1,1,3\}, y\epsilon\{-3,-1,1,3\}\} \qquad (13)$$

The distance between signal candidate points of 16QAM is $2/\sqrt{10}$.

In this embodiment, the signal candidate points of $s\hat{}\ T^{-1}s$ are arranged with regularity by decreasing the distance between signal candidate points of QPSK. A method of decreasing the distance between signal points of QPSK so that the signal candidate points of $\hat{s}=T^{-1}s$ are arranged with regularity may be the following expression.

[Math. 20]

$$\hat{Q}_4 \in \{2/\sqrt{10}+j2/\sqrt{10}, -2/\sqrt{10}+j2/\sqrt{10}, 2/\sqrt{10}-j2/\sqrt{10}, -2/\sqrt{10}-j2/\sqrt{10}\} \quad (14)$$

Figure 9:
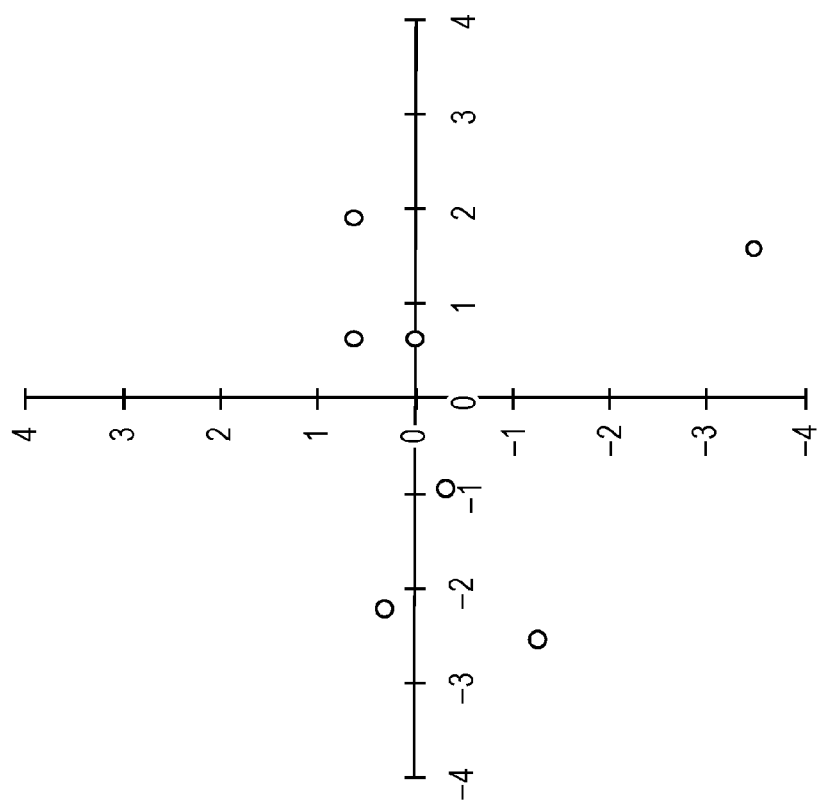
FIG. 9 is an illustration schematically showing signal candidate points.

The distance between signal candidate points is $\sqrt{2}$ in conventional QPSK, whereas the distance between signal candidate points is $4/\sqrt{10}$ in this embodiment. The distance is twice the distance between signal candidate points of 16QAM. FIG. 9 shows $T^{-1}s$ expressed by using QPSK with new signal candidate points expressed by Expression (14) and conventional 16QAM, similarly to FIG. 8.

It is found that $T^{-1}$'s depicted in FIG. 9 is aligned with one of signal candidate points of $T^{-1}$'s of 16QAM depicted in FIG. 5. Hence, if the data modulator 322 in the base station device 13 uses the QPSK modulation expressed by Expression (14), the precoding unit 332 in the base station device 13 can perform the modulo arithmetic on the transmit signal based on that all transmit signals are modulated by 16QAM.

In the above description, the modulation scheme used for each of spatially multiplexed data streams is one of QPSK and 16QAM. However, even if spatial multiplexing of 64QAM or 256QAM is provided, different modulation schemes may be used for respective data streams even if the LR technology is used, by adjusting the distance between signal points.

Use of QPSK, 16QAM, and 64QAM for adaptive modulation is considered. 64 signal candidate points of 64QAM are given by the following expression.

[Math. 21]

$$Q_{64} \in \{x/\sqrt{42}+jy/\sqrt{42}; x \in \{-7,-5,-3,-1,1,3,5,7\}, y \in \{-7,-5,-3,-1,1,3,5,7\}\} \quad (15)$$

In this case, the signal candidate points of QPSK and 16QAM may be adjusted in the conventional way as expressed by the following expressions.

[Math. 22]

$$\hat{Q}_4 \in \{x/\sqrt{42}+jy/\sqrt{42}; x \in \{-4,4\}, y \in \{-4,4\}\} \quad (16)$$

$$\hat{Q}_{16} \in \{x/\sqrt{42}+jy/\sqrt{42}; x \in \{-6,-2,2,6\}, y \in \{-6,-2,2,6\}\} \quad (17)$$

The signal candidate points expressed by Expression (16) and Expression (17) are applied to QPSK and 16QAM. For 64QAM, conventional signal candidate points expressed by Expression (15) may be used and data modulation for respective data streams may be performed.

Since the signal candidate points are aligned with signal candidate points of $T^{-1}s$ (the interval between neighboring signal candidate points is $1/\sqrt{42}$) if 64QAM is used for all data streams, the precoding unit 332 of the base station device 13 may perform the modulo arithmetic on transmit signals based on an assumption that all data streams are modulated by 64QAM. It is to be noted that, with regard to the distance between neighboring signal candidate points of 64QAM, QPSK is four times that of 64QAM, and 16QAM is twice that of 64QAM.

Described above is the data modulation method that can be used for the adaptive modulation in case that QPSK and 16QAM are mixed and in case that QPSK, 16QAM, and 64QAM are mixed. As described above, in the method of this embodiment, from among data modulation schemes which may be possibly concurrently used, a modulation method of other modulation scheme, that is, a signal-point interval is determined based on the modulation scheme with the maximum modulation multilevel number.

Specifically, if $\delta$ is a signal-point interval of the modulation scheme with the maximum modulation multilevel number, a signal-point interval of a modulation scheme in which the multilevel number is smaller by 2 m bits than the maximum multilevel number may be 2 m$\delta$. In the above example, if 16QAM available for transmission by 4 bps/Hz is at the maximum modulation level, the signal-point interval of QPSK available for transmission by 2 bps/Hz may be twice that of 16QAM. If 64QAM available for transmission by 6 bps/Hz is at the maximum modulation level, the signal-point interval of 16QAM with 4 bps/Hz may be twice that of 64QAM, and the signal-point interval of QPSK with 2 bps/Hz may be four times that of 64QAM.

Also, the adjustment of the signal-point interval may be provided by controlling transmit power used for each modulation scheme. In the data modulator of the base station device, the above-described modulation schemes are applied to the respective data streams in accordance with the receive quality of the terminal device.

Then, the signal processing in the precoding unit 332 is described. The basic signal processing is similar to the signal processing of the precoding unit 330 in the base station device 12 according to the second embodiment.

However, the modulo width of the modulo arithmetic (see Expression (10-1)) for the input signal is set based on that the modulation scheme with the maximum modulation multilevel number from among the modulation schemes used in the adaptive modulation technology is used for transmit data for all terminal devices.

For example, if the maximum modulation level is 16QAM, the modulo width may be normally set at $4/\sqrt{10}$ regardless of the multilevel number of the modulation scheme used for transmit data for each terminal device.

The signal processing in the configuration devices other than the data modulator 322 and the precoding unit 332 is similar to that of the second embodiment, and the description is omitted.

4.2 Terminal Device

Next, the terminal device 23 is described; however, signal processing in other configuration devices is substantially similar to that of the second embodiment, and the description is omitted, except for signal processing in the channel compensator 432 and the data demodulator 442.

The channel compensator 432 performs normalization on the input receive signal by the power normalization coefficient. Then, the modulo arithmetic is applied, and the channel-compensator output is generated. At this time, regarding the modulo width, the optimal modulo width for the modulation scheme with the maximum modulation multilevel number in the adaptive modulation technology may be used.

The channel-compensator output is input to the data demodulator 442. The data demodulator 442 performs data demodulation based on the data modulation method used in the data modulator 322 of the base station device 13. In this embodiment, the distances between neighboring signal candidate points are different as compared with the conventional data modulation scheme, and hence data demodulation with regard to the difference is performed.

The data-demodulator output is input to a channel decoder 450, in which channel decoding is applied, and desirable data for each terminal device is generated.

Described in the third embodiment is the method of using different adaptive modulation technologies for respective data streams, while the downlink MU-MIMO transmission that performs the precoding using the LR technology is targeted. Provided in this embodiment is the method of adjusting the interval between signal candidate points of the modulation scheme with a small multilevel number with reference to the interval between signal candidate points of the modulation scheme with the maximum modulation multilevel number, from among mixed modulation schemes. The method of this embodiment can be easily realized as compared with the data modulation scheme targeted in the first and second embodiments, as long as the power adjustment is performed on the conventional modulation scheme.

5. Fourth Embodiment

In the method provided in the third embodiment, the interval between signal candidate points is decreased as compared with the modulation scheme used as the conventional scheme. This represents that an error occurrence probability due to a noise applied in the terminal device is increased as compared with the conventionally used modulation scheme.

In the fourth embodiment, a method of allowing the adaptive modulation technology to be performed in the downlink MU-MIMO transmission that performs the precoding based on the LR technology, by a data modulation method different from the method targeted in any of the first, second, and third embodiments.

In the fourth embodiment, like the second embodiment, it is considered that U terminal devices 24 each having one receive antenna are connected with a base station device 14 having $N_t$ transmit antennas. Description is provided based on $N_t=U$. However, the number of transmit antennas may differ from the number of concurrently connected users.

The base station device 14 and the terminal device 24 according to the fourth embodiment are described with reference to FIGS. 14 and 15. Signal processing in respective configuration devices is substantially similar to the signal processing in the respective configuration devices according to the second embodiment. Different points are data modulators 324 and a precoding unit 334 in the base station device 14, and a channel compensator 434 and a data demodulator 444 in the terminal device 24. Hereinafter, signal processing in these four configuration devices is mainly described.

5.1 Base Station

First, the configuration of the base station device is described. Signal processing in the data modulators 324 of the base station device 14 is described first. First, a case of using 16QAM and QPSK for respective data streams is considered. FIG. 3(b) shows signal candidate points of 16QAM. At this time, in the first embodiment, the signal candidate points of QPSK are determined by extracting 4 points from the 16 points shown in FIG. 3(b).

In the fourth embodiment, instead of the signal candidate points shown in FIG. 3(b), desirable 4 points are extracted from all signal candidate points available for Ts calculated by the transmit signal vector s formed of the 16QAM modulation signal, and the unimodular matrix T shown in FIG. 5.

A method of selecting desirable 4 points is not particularly limited. For example, a method of selecting 4 points with the minimum mean transmit power may be conceived. Also, if control information can be exchanged with the terminal device 24 and the base station device 14 has recognized channel state information to the terminal device 24, 4 points with the minimum required transmit power may be extracted in accordance with the channel state.

This can be applied to a case that the modulation scheme with the maximum modulation multilevel number is 64QAM. By extracting desirable 16 points and 4 points from all signal candidate points available for Ts which is calculated by the transmit signal vector s formed of the 64QAM modulation signal and the unimodular matrix T, the 16 points and the 4 points may be defined as signal candidate points of 16QAM and QPSK. With any modulation scheme, the number of signal candidate points available for Ts is infinite in the signal point region. A new modulation scheme defined by extracting K signal candidate points from the signal candidate points may be used as a modulation scheme available for transmission by $(\log_2 K)$ bps/Hz.

In the data modulator 324 of the base station device 14 according to the fourth embodiment, the modulation scheme to be applied to each data stream is determined based on control information which is associated with the transmission quality notified from the terminal device 24. The modulation scheme used at this time may be the modulation scheme defined based on the above description.

Then, signal processing in the precoding unit 334 is described. The basic signal processing is similar to the signal processing of the precoding unit 332 in the base station device 12 according to the second embodiment. However, the modulo width of the modulo arithmetic (see Expression (10-1)) for the input signal is set based on an assumption that the modulation scheme with the maximum modulation multilevel number from among the modulation schemes used in the adaptive modulation technology is used for transmit data for all terminal devices.

For example, if the maximum modulation level is 16QAM, the modulo width may be normally set at $4/\sqrt{10}$ regardless of the multilevel number of the modulation scheme used for transmit data for each terminal device.

The signal processing in the configuration devices other than the data modulator 324 and the precoding unit 334 is similar to that of the second embodiment, and the description is omitted.

5.2 Terminal Device

Next, the terminal device 24 is described; however, signal processing in other configuration devices is substantially similar to that of the second embodiment, and the description is omitted, except for signal processing in the channel compensator 434 and the data demodulator 444.

The channel compensator 434 performs normalization on the input receive signal by the power normalization coefficient. Then, the modulo arithmetic is applied, and the channel-compensator output is generated. At this time, regarding the modulo width, an optimal modulo width for the modulation scheme with the maximum modulation multilevel number in the adaptive modulation technology may be used.

The channel-compensator output is input to the data demodulator 444. The data demodulator 444 performs data demodulation based on the data modulation method in the data modulator 324 of the base station device 14. In this embodiment, the distances between neighboring signal candidate points are different as compared with the conventional data modulation scheme, and hence data demodulation with regard to the difference is performed.

The data-demodulator output is input to the channel decoder 450, in which channel decoding is applied, and desirable data for each terminal device is generated.

The fourth embodiment has been aimed at the downlink MU-MIMO transmission that performs the precoding using the LR technology, and the data modulation scheme that can use the adaptive modulation technology using different modulation schemes for the respective data streams has been described. Even in the fourth embodiment, the data modulation different from the conventional data modulation scheme is performed like the second and third embodiments. However, as compared with the second and third embodiments, the number of candidate points serving as signal candidate points for the modulation scheme with a smaller modulation multilevel number than the maximum modulation multilevel number markedly increases, and hence a modulation scheme can be designed with a higher degree of freedom. If the optimal modulation scheme can be designed in accordance with the channel state information, the frequency utilization efficiency can be further improved.

6. Fifth Embodiment

The second to fourth embodiments have been aimed at the downlink MU-MIMO transmission in which the plurality of terminal devices are considered as the large-scale antenna array. However, the MU-MIMO transmission is not limited to the downlink transmission, and if the MU-MIMO transmission is performed for the uplink transmission, the frequency utilization efficiency can be markedly improved.

A fifth embodiment is aimed at uplink MU-MIMO transmission in which the spatial demultiplexing technology is based on the LR technology, and is also aimed at a case that the adaptive modulation technology is performed.

In the fifth embodiment, it is considered that U terminal devices 25 each having one receive antenna are connected with a base station device 15 having $N_t$ antennas. Description is provided below based on $N_t$=U. The respective terminal devices transmit transmit data to the base station device 15 over a single wireless resource. In the base station device 15, signals transmitted from the respective terminal devices are spatially multiplexed and received. By applying spatial demultiplexing processing on the received signals, data transmitted from the respective terminal devices is detected.

6.1 Terminal Device

Figure 16:
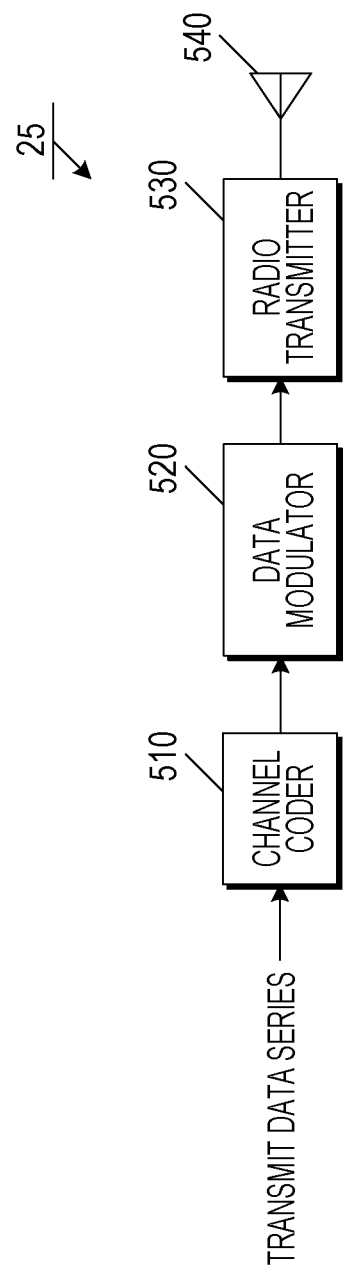
FIG. 16 is an illustration showing a configuration of a terminal device according to a fifth embodiment.

FIG. 16 shows a configuration of the terminal device 25 according to the fifth embodiment. In the terminal device 25, the transmit data is first input to a channel coder 510, in which channel coding is performed. The channel-coder output is input to a data modulator 520, in which data modulation is performed. In this embodiment using the adaptive modulation technology, the processing performed by the channel coder 510 and the data modulator 520 are determined based on control information associated with a receive quality notified from the base station device 15. In this embodiment, like the embodiments described above, description is given based on an assumption that the control information is ideally already notified and a channel coding rate and a data modulation level to be applied are determined.

The data modulation performed in the data modulator 520 uses the data modulation scheme described in the first embodiment. This is because the spatial demultiplexing processing based on the LR technology is performed in a spatial demultiplexing processor of the base station device 15, which will be described later.

The data-modulator output is input to a radio transmitter 530, in which a transmit signal in a baseband is converted into a transmit signal in a radio-frequency (RF) band. The output signal of the radio transmitter 530 is transmitted from each transmit antenna 540.

6.2 Base Station

Figure 17:
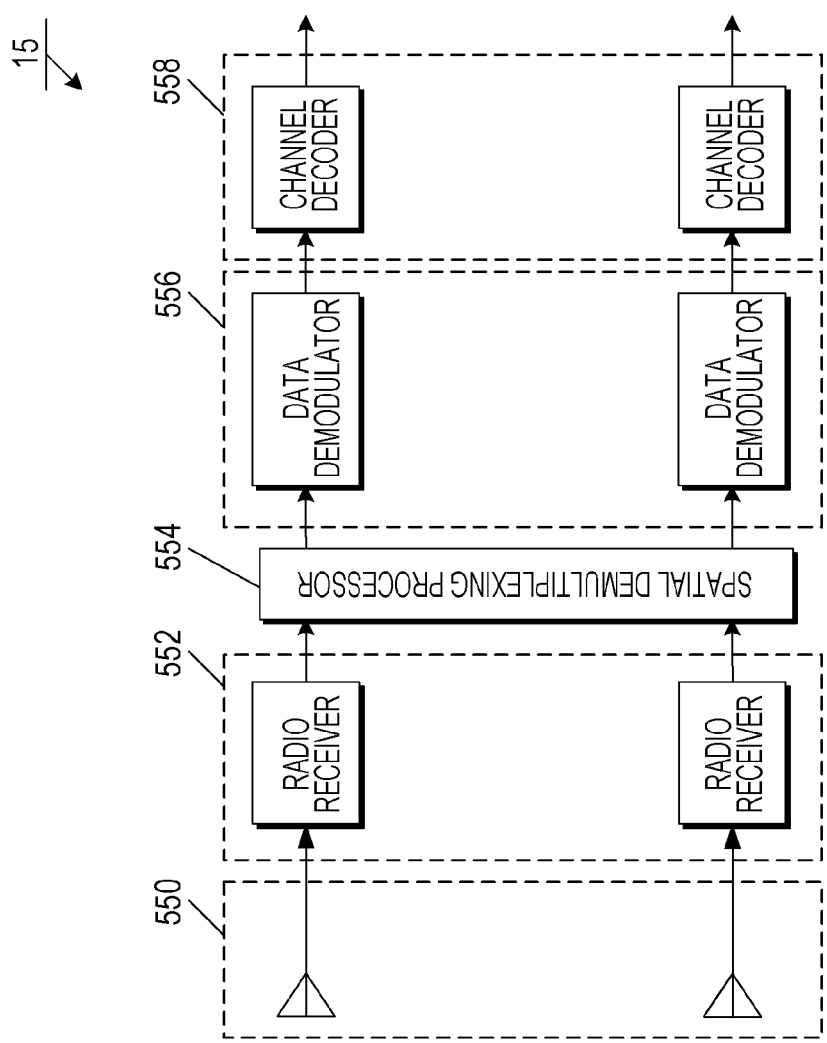
FIG. 17 is an illustration showing a configuration of a base station device according to the fifth embodiment.

Next, the base station device is described. FIG. 17 shows a configuration of the base station device 15 according to the fifth embodiment. The configuration of the base station device 15 includes transmit antennas 550, radio receivers 552, a spatial demultiplexing processor 554, data demodulators 556, and data decoders 558. The configuration is substantially similar to the configuration of the terminal device 20 according to the first embodiment shown in FIG. 11. A different point is that a signal output from the spatial demultiplexing processor 554 is data associated with transmit data that is transmitted from each terminal device. Hence, the data-demodulator outputs are input to the channel decoders associated with the respective terminal devices, and channel decoding is performed, unlike the terminal device 20 according to the first embodiment.

Signal processing in other device configurations is similar to signal processing in the respective configuration devices of the terminal device 20 according to the first embodiment, and hence the description is omitted.

In the spatial demultiplexing processor 230, the receive signal and the channel matrix are defined like Expression (1-1). An m-row n-column component of a channel matrix represents a complex channel gain between an m-th receive antenna of the base station device 15 and an n-th terminal device. Also, an n-th element of the spatial-demultiplexing-processor output $\hat{s}_Q$ represents a decision value of a signal transmitted from the n-th terminal device.

It is to be noted that, in this embodiment, a wireless communication scheme is not particularly limited. Although the description is aimed at narrow-band transmission, for example, the invention may be applied to an orthogonal frequency division multiplexing access (OFDMA) scheme. In this case, the invention may be applied to each sub-carrier, or the invention may be applied to each resource block that is a group of a plurality of sub-carriers. Alternatively, the invention may be applied to a single-carrier-based access scheme, such as single carrier frequency division multiplexing access (SC-FDMA).

With the fifth embodiment, even in the uplink MU-MIMO transmission using the precoding with the LR technology, a modulation scheme can be determined for transmit data from each terminal device to a base station device, independently from data modulation schemes used by other terminal devices in accordance with a receive quality. The uplink MU-MIMO transmission using the LR technology can contribute to further improvement of frequency utilization efficiency.

7. Sixth Embodiment

The first to fifth embodiments are each aimed at the wireless communication system in which the plurality of terminal devices are connected basically with the single base station device. A representative example of such a wireless communication system may be a cellular system or a wireless LAN. Meanwhile, in the cellular system, a service area is normally divided into a plurality of cells, a single base station device is arranged per cell, the base station device makes communication with the terminal device that is present in the own cell (see FIG. 18).

Figure 18:
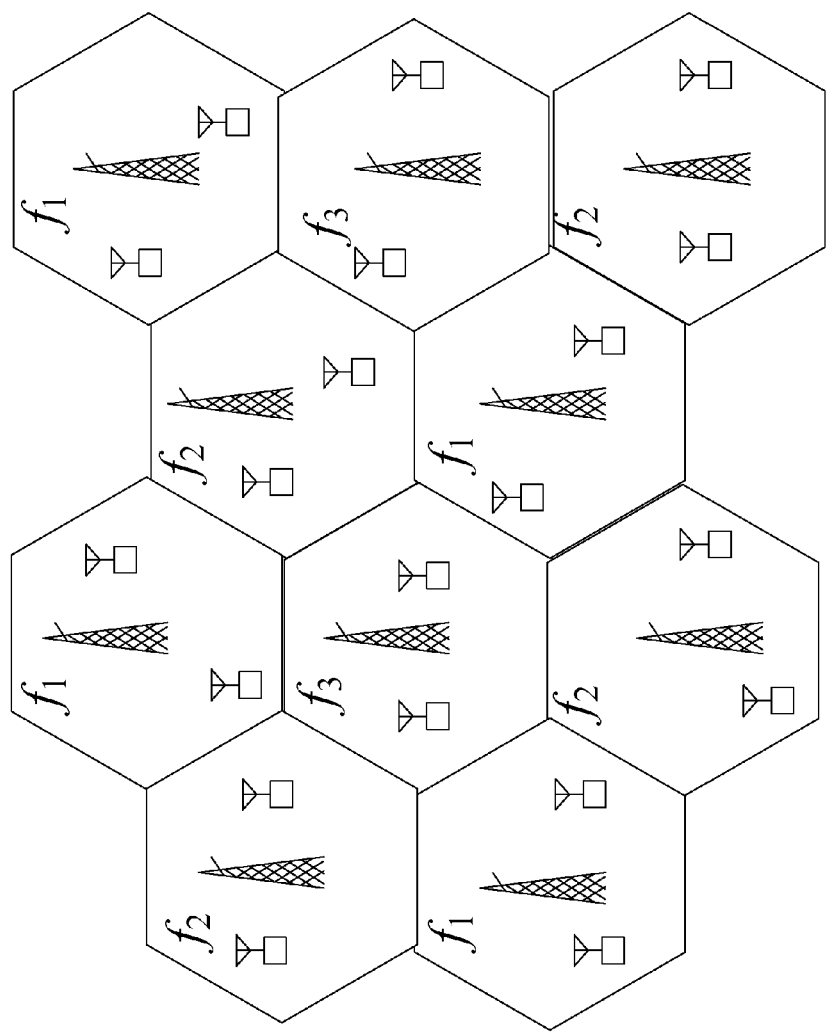
FIG. 18 is an illustration for explaining a wireless communication system according to a sixth embodiment.

To increase the frequency utilization efficiency, the cellular system performs frequency reuse in which the same frequency is used in different cells. FIG. 18 is aimed at 3-cell frequency reuse. If all cells use the same frequency, this is 1-cell frequency reuse.

If the frequency reuse is performed, a terminal device present at an edge of a cell receives not only a signal from a base station device in the own sell, but also a signal transmitted from a base station device in other cell using the same frequency, as an interference. Thus, the receive quality is decreased. As a method of improving the receive quality, there is suggested a method of increasing a distance for frequency reuse. However, this may decrease the frequency utilization efficiency.

Owing to this, recently, a technology called distributed antenna system (DAS) (also called distributed antenna network (DAN)) is receiving attention. IN DAS, a plurality of antennas owned by a base station device are arranged in a cell in a distributed manner.

In DAS, signals are transmitted from not only the base station device but also the antennas arranged in a distributed manner. Accordingly, the physical distance between a transmit antenna and a terminal device is decreased, and the receive quality of even the terminal device at the edge of the cell is improved. DAS is also a method of realizing coordinated multi-point (CoMP) transmission.

Figure 19:
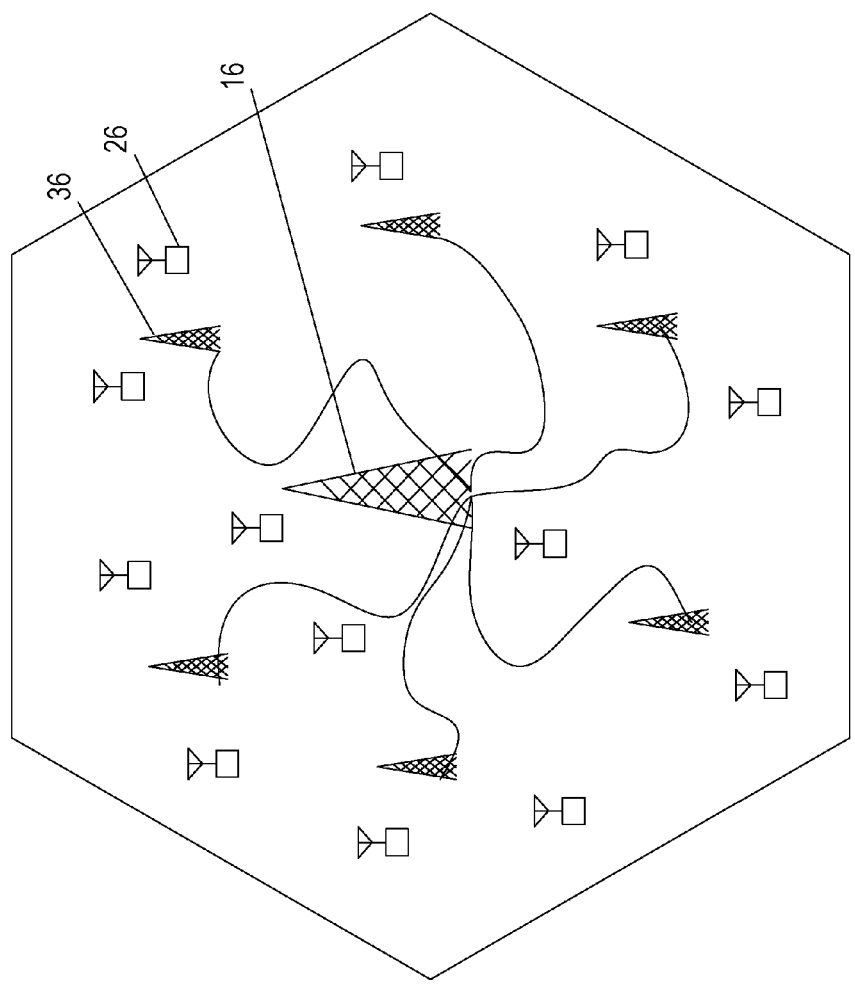
FIG. 19 is an illustration for explaining the wireless communication system according to the sixth embodiment.

This case is shown in FIG. 19. In FIG. 19, a base station device 16 is connected with distributed antennas 36 through optical fibers. The precoding processing etc. targeted in the second embodiment is performed by the base station device 16. The distributed antennas 36 are basically only required to relay signals sent from the base station device 16 to a terminal device 26. Hence, the base station device can be realized with a very simple device as compared with the base station devices according to other embodiments. Alternatively, the base station device 16 may be wirelessly connected with the distributed antennas 36.

The sixth embodiment is aimed at a case that the spatial demultiplexing processing technology using the LR technology is used for DAS. The sixth embodiment is aimed at the downlink transmission. However, this technology may be applied to the uplink transmission of DAS.

In this embodiment, it is assumed that a terminal device 26 having $N_r$ receive antennas communicate with surrounding $N_t$ distributed antennas 36 and different pieces of data are transmitted from the respective distributed antennas 36. It is to be noted that $N_r=N_t$.

The base station device 16 generates transmit data to be transmitted to the respective distributed antennas, and notifies the respective distributed antennas about the transmit data through the optical fibers. The respective distributed antennas transmit the notified signals with a proper transmit power. The terminal device 26 performed spatial demultiplexing processing on spatially multiplexed signals, so that desirable data streams are demultiplexed and detected.

7.1 Base Station

Figure 20:
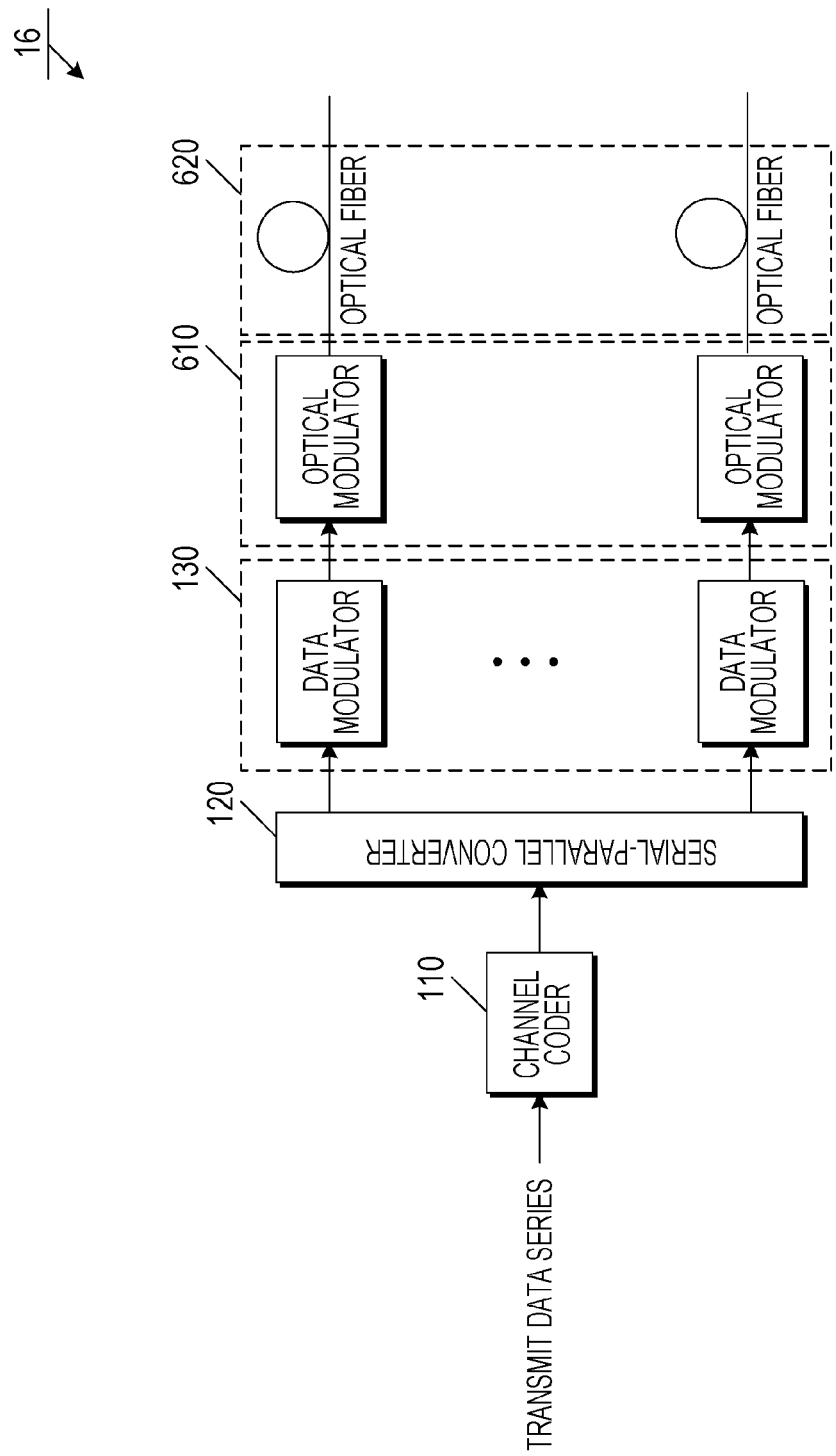
FIG. 20 is an illustration showing a configuration of a base station device according to the sixth embodiment.

FIG. 20 shows a configuration of the base station device 16 according to the sixth embodiment. The base station device 16 includes a channel coder 110, a serial-parallel converter 120, data modulators 130, and optical modulators 610. The base station device 16 is connected to optical fibers 620. Herein, the device configuration is substantially similar to FIG. 10, and signal processing in respective configuration devices is also similar to that described above. In the data modulators 130, the data modulation scheme described in the first embodiment is applied to each data stream in accordance with the receive quality of the terminal device 26.

FIG. 20 differs from FIG. 10 in that a part serving as the radio transmitter in FIG. 10 is the optical modulator (E/O) 610, and a part serving as the antenna in FIG. 10 is the optical fiber 620. In the optical modulator 610, an input electric signal is converted into an optical signal by modulating the intensity of a light source by using a conversion circuit. The optical modulation method of is not particularly limited. For example, the optical modulation may be performed by a direct modulation scheme in which a light source such as a semiconductor laser is directly turned ON or OFF. Alternatively, the radio transmitter may be continuously arranged, and a RF signal of the radio-transmitter output may be input to the optical modulator.

Optical signals which are the optical-modulator outputs 610 are transmitted to distributed antennas through optical fibers. The transmission method to the respective distributed antennas may be connecting the optical modulators 610 of the base station device 16 and the distributed antennas 36 by one-to-one correspondence. Alternatively, the respective optical-modulator outputs may be transmitted over a single line by, for example, wavelength division multiplexing (WDM), and the outputs may be demultiplexed and transmitted to the respective distributed antennas by using an optical router arranged near the distributed antennas.

In the above description, communication between the base station device 16 and the distributed antennas 36 is aimed at wired communication with the optical fibers. However, the communication may be realized by another way of wired communication such as power line communication (PLC), or may be realized by wireless communication. Alternatively, the base station device may not be directly connected with the distributed antennas, and may be connected over different networks. In this case, the optical modulators and the optical fibers in FIG. 20 are properly changed.

7.2 Distributed Antenna

Figure 21:
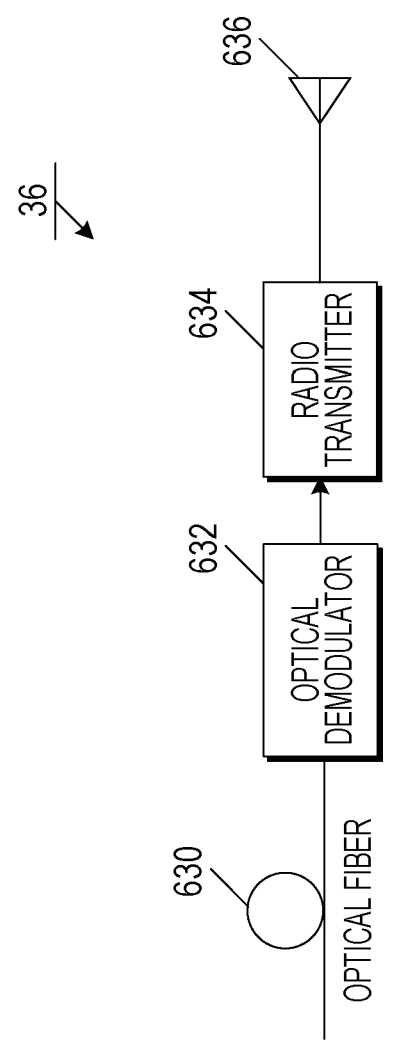

FIG. 21 shows a device configuration of the distributed antenna 36 according to the sixth embodiment. Description is provided below based on that the distributed antenna is connected from the base station device 16 through an optical fiber.

The optical signal notified through an optical fiber 630 is input to an optical demodulator (O/E) 632, in which the optical signal is converted into an electric signal. The optical-demodulator output is then input to a radio transmitter 634, in which the output is converted into a signal in a RF band. The radio-transmitter output is transmitted from a transmit antenna 636.

In the sixth embodiment, the distributed antenna 36 has one input and one transmit antenna. However, the distributed antenna 36 may have a plurality of inputs and a plurality of transmit antennas.

7.3 Terminal Device

FIG. 22 shows a configuration of a terminal device according to the sixth embodiment. The device configuration is similar to that in FIG. 11, and signal processing in the configuration devices are also similar to those described above, and hence a major part of description is omitted. However, signal processing in a spatial demultiplexing processor 650 is slightly different.

In the signal processing in the spatial demultiplexing processor 650, channel state information between a transmitter and a terminal device is required. In the first embodiment, the channel state information between the base station device and the terminal device has been used. In the sixth embodiment, spatial demultiplexing processing is performed by using channel state information between a distributed antenna, to which a terminal device is connected, and the terminal device.

At this time, in the first embodiment, $h_{m,n}$ may be apparently replaced with a complex channel gain between an m-th receive antenna and an n-th distributed antenna of the terminal device in the channel matrix expressed by Expression (1-1) defined as the channel matrix between each transmit antenna and each receive antenna of the terminal device, and the subsequent calculation may be performed.

In the above description, a line between the base station device 16 and the distributed antenna 36 has been a static line. That is, it is assumed that the input of the optical modulator 610 of the base station device 16 is equal to the output of the optical demodulator 632 of the distributed antenna. However, even if an optical fiber is used, the channel of the line between the base station device 16 and the distributed antenna 36 is actually a channel having selectivity, such as time selectivity depending on the surrounding environment etc., such as heat, and wavelength selectivity caused by a delayed wave in the optical fiber.

Even if the base station device 16 is connected with the distributed antenna 36 over wireless communication, the channel may be a time-frequency selective channel due to a variation in local scatterers of the distributed antenna 36, and a delayed wave. In this case, the base station device 16 may transmit a known reference signal to the terminal device 26 through the distributed antenna 36, and the terminal device 26 may perform channel estimation with regard to a variation in channel between the base station device 16 and the distributed antenna 36. That is, the process from the optical-modulator output in the base station device 16 to the radio-transmitter output in the distributed antenna is considered as a channel.

Signal processing in the spatial demultiplexing processor 650 is similar to that described above except the handling of the channel state information described above, and hence description for detailed signal processing is omitted. Also, the data demodulator 240 to which the spatial-demultiplexing-processor output is input may perform data demodulation as described in the first embodiment, for example, by obtaining the square Euclidean distance with respect to the signal candidate point, in accordance with the actually used data modulation scheme.

The embodiment to which the invention is applied and which is aimed at DAS has been described above. In the above description, only one terminal device has been connected to the distributed antenna. However, the number of terminal devices connected to the distributed antenna may be two or more. In this case, the base station device may perform the precoding processing described in the second embodiment, on the transmit signal for each terminal device. That is, in DAS, the MU-MIMO transmission may be performed between a plurality of distributed antennas and a plurality of terminal devices.

In the sixth embodiment, the embodiment of the invention in DAS, in which the distributed antenna 36 is arranged between the base station device 16 and the terminal device 26 has been described. With DAS, the transmission distance between the transmitter and the terminal device can be physically decreased. Accordingly, the phenomenon, in which the transmission quality of a user located at an edge of a cell is markedly degraded like the conventional cellular system, does not occur.

Also, complicated signal processing like the base station device 16 of the conventional cellular system is not required for the distributed antenna. Accordingly, the distributed antenna can be installed with low cost, and the service area can be easily expanded. Also, in DAS, the MIMO transmission using the LR technology can be applied together with the adaptive modulation technology if the invention is used. The frequency utilization efficiency can be further improved.

8. Modification

The embodiments of the present invention have been described in detail with reference to the drawings. However, the specific configuration is not limited to the embodiments, and design etc. within a scope not departing from the idea of the present invention is also included in the scope of the claims.

A program that operates in a terminal device and a base station device relating to the present invention is a program that controls a CPU etc. (a program that causes a computer to function) to realize the functions of the embodiments relating to the invention. Also, information handled by the devices are temporarily accumulated in a RAM during processing, then stored in various ROMs and HDDs, and read, corrected, and written by the CPU if necessary. A storage medium that stores the program may be a semiconductor medium (for example, ROM, or non-volatile memory card), an optical storage medium (for example, DVD, MO, MD, CD, or BD), and a magnetic storage medium (for example, magnetic tape, or flexible disk). Also, not only the functions of the above-described embodiments are realized by executing the loaded program, but also functions of the present invention may be realized by performing processing in cooperation with an operating system or other application program.

Also, in case of distribution to the market, the program may be stored in a portable storage medium and may be distributed, or the program may be transferred to a server computer connected through a network such as the Internet. In this case, a storage device of the server computer is included in the invention. Also, part or all of the terminal device and the base station device in the above-described embodiments may be realized typically as a LSI which is an integrated circuit. Respective function blocks of the terminal device and the base station device may be individually formed of processors, or part or all of the function blocks may be integrally formed of processors. Also, a method of forming an integrated circuit is not limited to LSI, and may be realized by a dedicated circuit or a general processor. Also, if a technology of forming an integrated circuit instead of LSI appears by progress of semiconductor technologies, an integrated circuit with the technology may be used.

REFERENCE SIGNS LIST

10 base station device
110 channel coder
120 serial-parallel converter
130 data modulator
140 radio transmitter
150 transmit antenna
20 terminal device
210 receive antenna
220 radio receiver
230 spatial demultiplexing processor
240 data demodulator
250 parallel-serial converter
260 channel decoder

The invention claimed is:

1. A base station device that includes a plurality of antennas and makes communication with a plurality of terminal devices each having at least one antenna, comprising:
 a data modulator
  acquiring first control information notified form the plurality of terminal devices and associated with receive qualities of the plurality of terminal devices and performing data modulation on a plurality of pieces of transmit data for the plurality of terminal devices, by using a plurality of different data modulation schemes one by one, based on the first control information;
 a precoding section
  acquiring second control information associated with first channel state information between the base station device and the plurality of terminal devices, acquiring the first channel state information, based on the second control information; and
  performing precoding on the plurality of pieces of transmit data after the data modulation, based on first channel matrix and a second channel matrix in which the first channel matrix is multiplied by a transform matrix; and
 a radio transmitter spatially multiplexing the plurality of pieces of transmit data after the precoding over a single wireless resource and transmitting a spatially multiplexed signal; and
 the transform matrix is a unimodular matrix that transforms the first channel matrix into a matrix with high orthogonality; and each of the plurality of the data modulation schemes realizes a different frequency utilization efficiency, and a signal point interval between signal candidate points of the plurality of the different data modulation schemes is an integral multiple of an interval between the signal candidate points of a first data modulation scheme realizing a maximum frequency utilization efficiency among the plurality of the different data modulation schemes.

2. The base station device according to claim 1, wherein the signal candidate point of each of the plurality of data modulation schemes is extracted from a signal candidate point of a second data modulation scheme which is calculated from the first data modulation scheme and the transform matrix.

3. The base station device according to claim 1, wherein the precoding is nonlinear arithmetic processing including a modulo arithmetic.

4. A wireless communication system including a base station device having a plurality of antennas, and a plurality of terminal devices each having at least one antenna,
said base station device including:
a data modulator acquiring first control information notified from the plurality of terminal devices and associated with receive qualities of the plurality of terminal devices and performing data modulation on a plurality of pieces of transmit data for the plurality of terminal devices, by using a plurality of different data modulation schemes one by one, based on the first control information; and
a radio transmitter transmitting a transit signal subject to the data modulation, and
each of the plurality of the data modulation schemes realizes a different frequency utilization efficiency, and the data modulator extracts signal candidate points of the plurality of the different data modulation schemes from signal candidate points of a first data modulation scheme which realizes a maximum frequency utilization efficiency among the plurality of the different data modulation schemes; and
each of the plurality of terminal device includes:
a radio receiver receiving a signal transmitted from the based station device; and
a spatial demultiplexing processor acquiring a first channel matrix between the base station and the plurality of terminal devices, acquiring a second channel matrix in which the first channel matrix is multiplied by a transform matrix and acquiring desired transmit data from the reception signal, based on the second channel matrix, and the transform matrix is a unimodular matrix that transforms the first channel matrix into a matrix with high orthogonality.

* * * * *